(12) United States Patent
Kargupta et al.

(10) Patent No.: US 6,708,163 B1
(45) Date of Patent: Mar. 16, 2004

(54) COLLECTIVE DATA MINING FROM DISTRIBUTED, VERTICALLY PARTITIONED FEATURE SPACE

(76) Inventors: Hillol Kargupta, 975 SW. Meyer Dr., Pullman, WA (US) 99163; Daryl E. Hershberger, 670 Smith Dr., Woodburn, OR (US) 97071; Erik L. Johnson, 1405 Merman Dr., Apt. B-216, Pullman, WA (US) 99163; Byung-Hoon Park, 1630 NE. Valley Rd. #D202, Pullman, WA (US) 99163

( * ) Notice: Subject to any disclaimer, the term of this patent is extended or adjusted under 35 U.S.C. 154(b) by 0 days.

(21) Appl. No.: 10/287,331

(22) Filed: Nov. 1, 2002

Related U.S. Application Data

(63) Continuation of application No. 09/513,240, filed on Feb. 24, 2000, now abandoned.
(60) Provisional application No. 60/121,331, filed on Feb. 24, 1999.

(51) Int. Cl.[7] ............................................. G06F 17/30
(52) U.S. Cl. ........................ 707/3; 707/102; 707/10
(58) Field of Search ......................... 707/10, 3, 102; 706/16

(56) References Cited

U.S. PATENT DOCUMENTS

| | | | | |
|---|---|---|---|---|
| 5,321,612 A | * | 6/1994 | Stewart | 702/13 |
| 5,692,029 A | * | 11/1997 | Husseiny et al. | 378/88 |
| 5,911,872 A | * | 6/1999 | Lewis et al. | 205/787 |
| 5,970,482 A | * | 10/1999 | Pham et al. | 706/16 |
| 6,132,381 A | * | 10/2000 | Forbes et al. | 600/483 |
| 6,523,026 B1 | * | 2/2003 | Gillis | 707/3 |

* cited by examiner

Primary Examiner—Greta Robinson
Assistant Examiner—S R Pannala
(74) Attorney, Agent, or Firm—Christensen O'Connor Johnson Kindness PLLC

(57) ABSTRACT

A system and method for collective data mining from a distributed, vertically partitioned feature space as described. Collective data mining involves a unique approach for finding patterns from a network of databases, each with a distinct feature space. A distributed data mining system from heterogeneous sites is described. The architecture is ideal for accommodating different inductive learning algorithms for data analysis at different sites and includes a scalable approach using a gene expression-based evolutionary algorithm. This approach is used for distributed fault detection in an electrical power distribution network. Further implementations are also described.

4 Claims, 8 Drawing Sheets

| f | $x_1$ | $x_2$ |
|---|---|---|
| 1.1 | 2.3 | 4.7 |
| 2.9 | 3.4 | 6.4 |
| 0.3 | 4.9 | 1.2 |
| 5.9 | 2.3 | 9.4 |
| 8.9 | 4.8 | 1.0 |

SITE A

| f | $x_3$ | $x_4$ |
|---|---|---|
| 1.1 | 4.3 | 7.4 |
| 2.9 | 1.3 | 3.4 |
| 0.3 | 0.9 | 3.1 |
| 5.9 | 6.3 | 6.4 |
| 8.9 | 4.8 | 1.0 |

SITE B

| f | $x_5$ | $x_6$ | $x_7$ |
|---|---|---|---|
| 1.1 | 4.3 | 1.7 | 2.0 |
| 2.9 | 2.4 | 6.4 | 3.7 |
| 0.3 | 3.9 | 2.2 | 3.1 |
| 5.9 | 4.2 | 1.2 | 2.1 |
| 8.9 | 2.9 | 7.2 | 6.0 |

SITE C

*Fig. 1.*

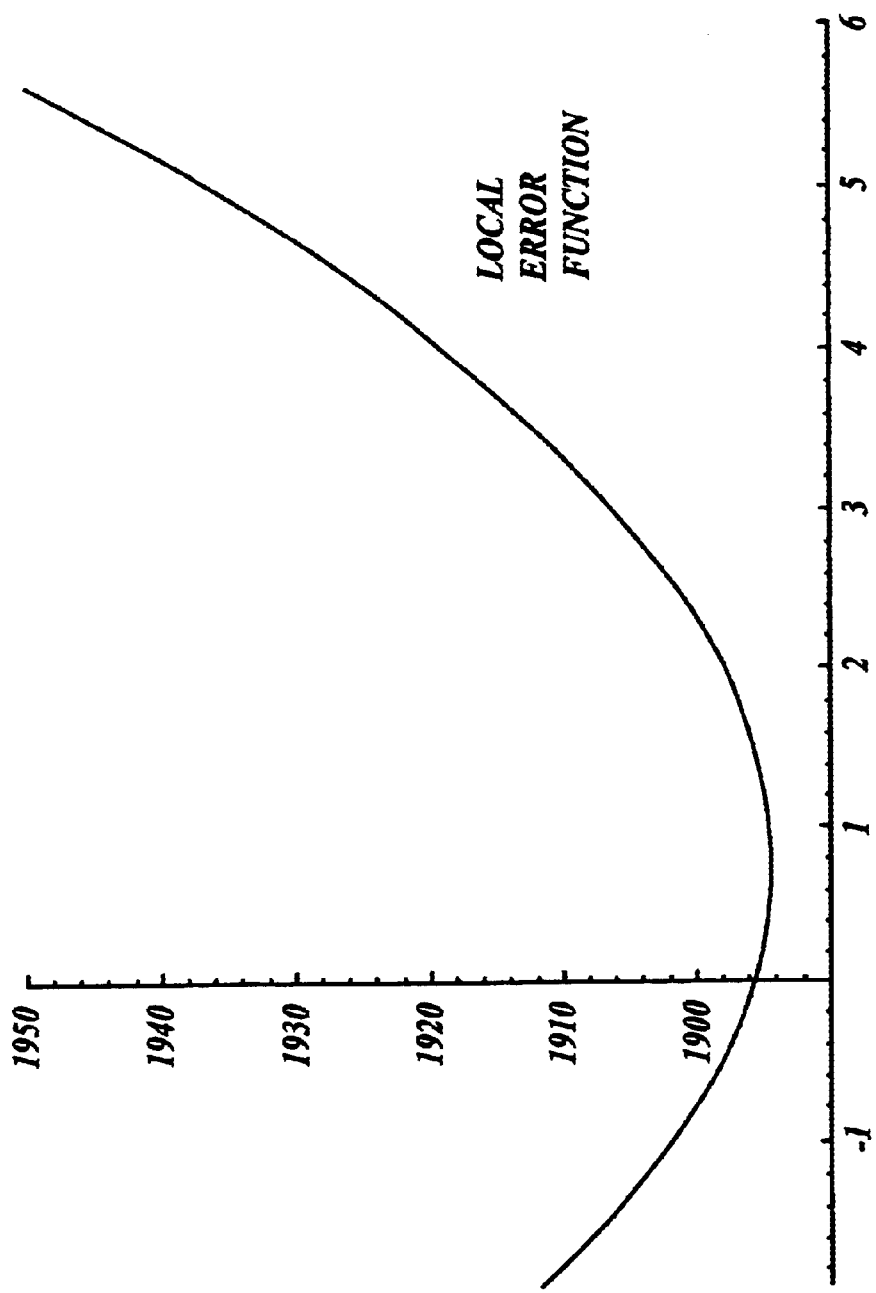

COLLECTIVE DATA MINING FROM DISTRIBUTED, VERTICALLY PARTITIONED FEATURE SPACE

CROSS-REFERENCES TO RELATED APPLICATIONS

This application is a continuation of application Ser. No. 09/513,240, filed Feb. 24, 2000, now abandoned priority from the filing date of which is hereby claimed under 35 U.S.C. §120. This application, through the above non-provisional application, claims the benefit of Provisional Application No. 60/121,331, filed Feb. 24, 1999, the benefit of which is claimed under 35 U.S.C. §119. All above applications are specifically incorporated herein by reference.

FIELD OF THE INVENTION

This invention relates in general to a network of databases and, in particular, to collective data mining from a distributed, vertically partitioned feature space.

BACKGROUND OF THE INVENTION

Distributed data mining (DDM) is a fast growing area that deals with the problem of finding data patterns in an environment with distributed data and computation. Although today most of the data analysis systems require centralized storage of data, the increasing merger of computation with communication is likely to demand data mining environments that can exploit the full benefit of distributed computation. For example, consider the following cases.

1. Example I: Imagine an epidemiologist, studying the spread of hepatitis-C in the U.S. She is interested in detecting any underlying relation of the emergence of hepatitis-C in U.S. with the weather pattern. She has access to a large hepatitis-C database at the Center for disease control (CDC) and an environmental database at EPA. However, they are at two different places and analyzing the data from both of them using a conventional data mining software will require combining the databases at a single location, which is quite impractical.

2. Example II: Two major financial organizations want to cooperate for preventing fraudulent intrusion into their computing system. They need to share data patterns relevant to fraudulent intrusion. However, they do not want to share the data since it is sensitive. Therefore, combining the databases is not feasible. Existing data mining systems cannot handle this situation.

3. Example III: A defense organization is monitoring a situation. Several sensor systems are monitoring the situation and collecting data. Fast analysis of incoming data and quick response is imperative. Collecting all the data to a central location and analyzing it there consumes time and this approach is not scalable for state-of-the-art systems with a large number of sensors.

4. Example IV: A drug manufacturing company is studying the risk factors of breast cancer. It has a mammogram image database and several databases containing patient tissue analysis results, food habits, age, and other particulars. The company wants to find out if there is any correlation between the breast cancer markers in the mammogram images with the tissue features or the age or the food habits.

5. Example V: A major multi-national corporation wants to analyze the customer transaction records for developing a successful business strategy quickly. It has thousands of establishments throughout the world and collecting all the data to a centralized data warehouse, followed by analysis using existing commercial data mining software, takes about a month of the time of the data warehouse team.

SUMMARY OF THE INVENTION

DDM offers an alternate approach to the analysis of distributed data that requires minimal data communication. Typically DDM algorithms involve local data analysis and generation of a global data model by combining the results of the local analysis. Unfortunately, naive approaches to local analysis may be ambiguous and incorrect, producing an incorrect global model. Particularly in the general case, where different sites observe different sets of features, this problem becomes very critical. Therefore developing a well-grounded methodology to address this general case is important. This paper offers a viable approach to the analysis of distributed, heterogeneous databases with distinct feature spaces using the so-called collective data mining (CDM) technology.

Section 2 describes the DDM problem considered here and some of the problems of naïve data analysis algorithms in a DDM environment. In Section 3, the foundation of CDM is presented followed by a discussion on construction of orthonormal representation from incomplete domains and the relation of such representation to mean square error. Sections 4 and 5 present the development of CDM versions of two popular data analysis techniques, decision tree learning and regression. Section 6 presents an overview of a CDM based experimental system called BODHI, that is currently under development. Section 7 summarizes the CDM work presented here, including the BODHI system, and discusses future research directions.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 illustrates a block diagram of three distributed data sites each having a vertically partitioned feature space;

FIG. 2B illustrates a graph of the local error function at one site depicted in FIG. 1;

DETAILED DESCRIPTION OF THE PREFERRED EMBODIMENT

Figure 2A:
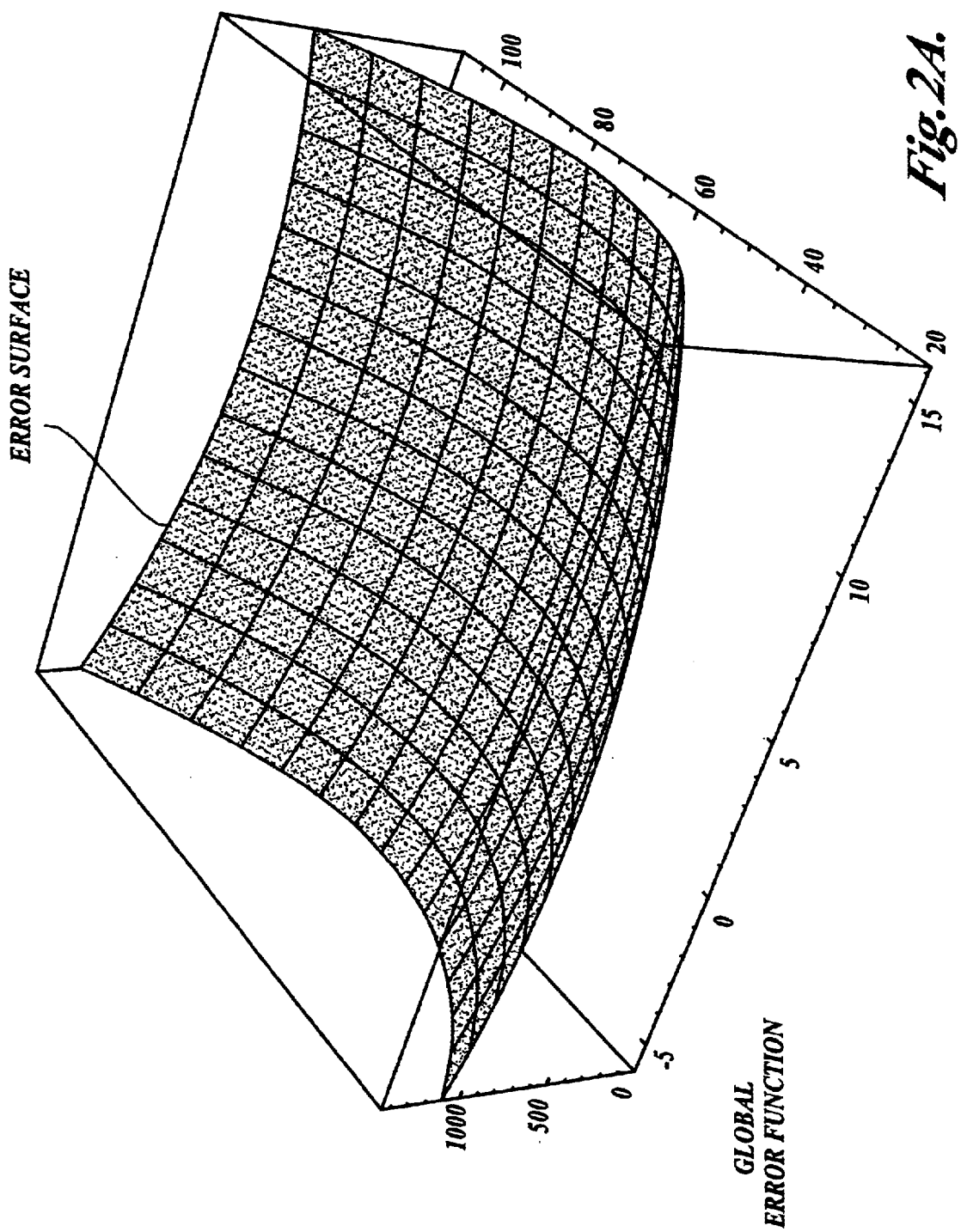
FIG. 2A illustrates a three-dimensional graph to show a global error function.

This section presents background material related to CDM. It first explains the general model of distributed, heterogeneous data sites considered here. Next, a review of related DDM and agent based system research is presented. The section concludes by showing that naive approaches to DDM in such an environment can be ambiguous or incorrect even for simple data modeling problems.

2.1 Problem Description

Distributed data mining (DDM) deals with the problem of finding data patterns in an environment with distributed data and computation. A typical application domain of DDM either has inherently distributed data sources or centralized data partitioned at different sites. The data sites may be homogeneous, i.e., each site stores data for exactly the same set of features. In the general case, however, the data sites may be heterogeneous, each site maintaining databases with different kinds of information.

In this general case the feature sets observed at different sites are different. This is sometimes called a vertically partitioned dataset. FIG. 1 illustrates this situation. In this chapter we consider the problem of supervised learning/analysis for the latter case. Given a set of observed feature values, the task is to learn a function that computes the unknown value of a desired feature as a function of other observed features. The given set of observed feature values is sometimes called the training data set. In FIG. 1 the column for $f$ denotes the feature value to be predicted; $x_1$, $x_2$, $x_3$, $x_4$, $x_5$, $x_6$ and $x_7$ denote the features that are used to predict $f$. The data sets available at the different sites are used as the training data. If the $f$ column is not observed everywhere then it is broadcasted to every site. As we see from the figure, different sites may observe different features and therefore they are called heterogeneous. There exists little work for this general case of DDM. The following section reviews related work in the distributed data mining field.

Although distributed data mining is a fairly new field, it has been enjoying a growing amount of attention since inception. As noted earlier most of the work in this area deals with horizontally partitioned feature spaces. This section briefly reviews some of these efforts and other related works. The meta-learning (Chan & Stolfo, 1993b; Chan & Stolfo, 1993a; Chan & Stolfo, 1998) based JAM system (Stolfo et al., 1997) is a distributed data mining framework used primarily for fraud detection in the banking domain (Lee, Stolfo, & Mok, 1999). This system develops patterns of fraudulent activity by mining the individual databases of the various financial institutions, and then combining the patterns to form an overall pattern. The JAM system is a java based multi-agent system in which different data mining agents are allowed to have different machine learning algorithms for learning classifiers. Classifiers generated on different data sets with potentially different algorithms are collected and inductive learning algorithms are run on this collection to generate new classifiers called meta-classifiers. This process may be continued iteratively resulting in a hierarchy of meta-classifiers. A number of different learning algorithms are available through this system. Another approach to multi-agent based distributed machine learning is described in (Provost & Hennessy, 1996; Provost & Aronis, 1996; Provost & Venkateswarlu, 1998).

The PADMA system (Kargupta, Hamzaoglu, Stafford, Hanagandi, & Buescher, 1996; Kargupta, Hamzaoglu, & Stafford, 1997) achieves scalability by locating agents with the distributed data sources. An agent coordinating facilitator gives user requests to local agents which then access and analyze local data, returning analysis results to the facilitator, which merges the results. The high level results returned by the local agents are much smaller than the original data, thus allowing economical communication and enhancing scalability. The authors report on a PADMA implementation for unstructured text mining but note that the architecture is not domain specific.

There are several examples of agent based systems for information discovery on the World Wide Web (Lesser, 1998; Menczer & Belew, 1998; Moukas, 1996). In (Yamanishi, 1997) the author presents two models of distributed Bayesian learning. Both models employ distributed agent learners, each of which observes a sequence of examples and produces an estimate of the parameter specifying the target distribution, and a population learner, which combines the output of the agent learners in order to produce a significantly better estimate of the parameter of the target distribution. One model applies to a situation in which the agent learners observe data sequences generated according to the identical target distribution, while the second model applies when the data sequences may not have the identical target distribution over all agent learners. Papyrus, another system in development by the National Center for Data Mining (Grossman, Bailey, Kasif, Mon, Ramu, & Malhi, 1998) is a hierarchical organization of the nodes within a data mining framework. The intent of this project is to develop a distributed data mining system that reflects the current distribution of the data across multiple sites, and the existing network configurations connecting these configurations. Another system under development in (Subramonian & Parthasarathy, 1998) concerns itself with the efficient decomposition of the problem in a distributed manner, and utilizes clustering and Expected Maximization algorithms for knowledge extraction. Work has also been done concerning using the Internet (Chattratichat, Darlington, Guo, Hedvall, Kohler, Saleem, Sutiwaraphun, & Yang, 1998) as the framework for large scale data mining operations. This work is also applicable to intranets, and addresses issues of heterogeneous platforms and security issues.

Effective coordination and communication among groups of distributed agents is important to the group performance on the task at hand. In (Mammen & Lesser, 1998) the authors investigate the inter-related issues of the timing of agent communication and the amount of information which should be communicated. A more robust method of communication of inductive inferences is presented in (Davies & Edwards, 1996). The authors suggest including in the communication the context from which the inference was formed, in the form of the version space boundary set. This allows the receiving agents to better integrate the information with the inference it has induced from local information.

The methods of combining local knowledge to optimize some global objective is another aspect of general distributed machine learning research which applies to DDM. A method of forming committees of decision trees in a multi-agent environment is presented in (Heath, Kasif, & Salzberg, 1996). Further work concerning the use of distributed decision trees include efforts by (Darlington, Guo, Sutiwaraphun, & To, 1997), which presents a parallel implementation of C4.5, and (Hall, Chawla, & Bowyer, 1998), which presents a method for combining the results of distributed decision trees.

The mining of association rules in distributed databases has also been examined in (Cheung, Ng, Fu, & Fu, 1996). In this work, the Distributed Mining of Association rules (DMA) algorithm is presented, which takes advantage of the inherent parallel environment of a distributed database, as opposed to previous works, which tended to be sequential in nature.

In (Davies & Edwards, 1995) the authors compare the relative performance of incremental theory revision and knowledge integration. They conclude that there is no difference in the accuracy of result and confirm the superior speed of knowledge integration for the data set evaluated.

Agent learning research concerns the ability of agents to independently improve their ability to perform their assigned tasks. A majority of agent learning approaches are based on reinforcement learning methods. A general survey of reinforcement learning methods is provided in (Kaelbling, Littman, & Moore, 1996).

Another example of a DDM system (Aronis, Kolluri, Provost, & Buchanan, 1996) is the WoRLD system for inductive rule-learning from multiple distributed databases. WoRLD uses spreading activation, instead of item-by-item matching, as the basic operation of the inductive engine. Database items are labeled with markers (indicating in or out of concept), which are then propagated through databases looking for values where in or out of concept markers accumulate. The authors note that WoRLD currently relies on manually maintained links between distributed databases and the assumption of a standardized vocabulary across heterogeneous databases. The fragmented approach to mining classifiers from distributed data sources is suggested by (Cho & Wüthrich, 1998). In this method, a single, best, rule is generated in each distributed data source. These rules are then ranked using some criterion and some number of the top ranked rules are selected to form the rule set. In (Lam & Segre, 1997) the authors extend efforts to automatically produce a Bayesian belief network from discovered knowledge by developing a distributed approach to this exponential time problem. A formal treatment of distributed databases is presented in (Nowak, 1998). The author asserts that the information contained in an individual database gives rise to a theory, and that given multiple databases, a set of theories results. He then casts this idea in terms of partial reasoning which he then relates to knowledge discovery. A basic requirement of algorithms employed in DDM is that they have the ability to scale up. A survey of methods of scaling up inductive learning algorithms is presented in (Provost & Venkateswarlu, 1998).

An important class of DDM problems often encountered in many practical DDM applications is that of vertically partitioned feature spaces. For the most part, DDM research has not adequately addressed the common occurrence of heterogeneous, distributed, data sets. An example of mining from vertically partitioned feature space can be found in (Provost & Buchanan, 1995). This work discusses the general issue of mining using different inductive biases and the result of combining the outcomes. They consider vertical partitioning of the feature space as one possible bias and show that such partitioning of the feature space and decomposing the problem into smaller sub-problems can be effectively used for problems that are decomposable. In the recent past Kargupta and his colleagues (Kargupta, Johnson, Riva Sanseverino, Park, Silvestre, & Hershberger, 1998) considered this case and proposed the so called collective data mining framework that makes use of orthonormal basis functions for correct local analysis.

The following section points out that naive approach of DDM in this case may be ambiguous and misleading.

2.3 Naïve Approach: May Be Ambiguous and Incorrect

Data modeling is a mature field that has many well-understood techniques in its arsenal. However, many of these traditional techniques cannot be directly used in a distributed environment with vertically partitioned feature space. In this section we shall see that even a simple, decomposable data modeling problem can be ambiguous and misleading in a distributed environment.

Let $f(x_1, x_2) = a_1 x_1 + a_2 x_2$. Consider the data set $$D = \{(x_1, x_2, f(x_1, x_2))\} = \{(0,0,0), (1, 0, a_1), (0, 1, a_2), (1, 1, a_1+a_2)\}$$

generated by $f(x_1, x_2)$. When both the variables and the corresponding $f(x_1, x_2)$ value are observed at the same site, fitting a linear model of the form $\hat{f}(x_1, x_2) = b_0 + b_1 x_1 + b_2 x_2$ to the data is quite straightforward.

Now consider a distributed environment with two sites, A and B. A observes $\{(x_1, f(x_1, x_2))\}$ and B observes $\{(x_2, f(x_1, x_2))\}$. Consider the data set at A, $D_A = \{(0,0), (1, a_1), (0, a_2), (1, a_1+a_2)\}$. If site A now tries to fit a local linear model of the form $\hat{f}_A(x_1) = b'_0 + b'_1 x_1$ to the data, then it will get four different solutions of the coefficients, $\{(b'_0, b'_1)\} = \{(0, a_1), (0, a_1+a_2), (a_2, a_1), (a_2, a_1-a_2)\}$. A similar situation also arises at site B. Resolving these ambiguities requires communication between the two sites. The collective data mining approach offers a solution to this decomposable problem with no communication at all. However, before discussing the CDM let us investigate another possibility: generating local models that minimize the error between the correct value of $f(x_1, x_2)$ and the models. Unfortunately, as shown in the following, this may also lead to misleading results. Consider the function, $g(x_1, x_2) = 5x_1 + 67.9x_2$, where $x_1$ and $x_2$ are real valued variables. Consider the sample data set $D = \{(1.1, 0.1, 12.29), (1.5, -1.0, -60.4), (-1.9, -0.5, -43.45)\}$, where each entry is of the form $(x_1, x_2, g(x_1, x_2))$. Let us try to fit a model, $\hat{g}(x_1, x_2) = b_1 x_1 + b_2 x_2$, to this data by minimizing the mean-square error. The overall mean square error computed over the data set D is, $1/3\Sigma_{x_1, x_2 \in D}(g - \hat{g})^2 = 2.3567(5-b_1)^2 + 0.42(67.9-b_2)^2 - 0.1467(5-b_1)(67.9-b_2)$.

FIG. 2 (Left) shows the error surface with a global minima at $b_1 = 5$ and $b_2 = 67.9$. It is a simple quadratic function and finding the minima is quite straightforward.

Now let us consider the data set to be vertically partitioned; meaning, $x_1$ is observed at site A and $x_2$ is observed at a different site B. Let us choose a linear model, $\hat{g}(x_1) = b_1 x_1$. The mean square error function for site A is, $1/3\Sigma_{x_1, x_2 \in D}(f - \hat{f})^2 = 2.3567(5-b_1)^2 + 1936.3722 - 19.9173(5-b_1))$. FIG. 2 (Right) shows this local error function. It clearly shows that the minima of this error function is not same as the globally optimal value of $b_1$, i.e., 5. This example demonstrates even for simple linear data and model, naive approaches to minimize mean-square error may be misleading in a distributed environment. The CDM offers a correct, viable solution to this problem. The following section presents the CDM.

3 THE FOUNDATIONS OF COLLECTIVE DATA MINING

Detecting patterns using data mining techniques first requires defining the notion of patterns. Patterns can be viewed in terms of relations. In the case of unsupervised learning, patterns are interpreted as relations among the different members of the domain. In the case of supervised learning, relations among the different members of the domain and the corresponding members in the range (class labels or the output function values, denoted by Y) are desired. In supervised inductive learning, the goal is to learn a function $\hat{f}: X^n \to Y$ from the data set $\Omega = \{(x_{(1)}, y_{(1)}), (x_{(2)}, y_{(2)}), \ldots (x_{(k)}, y_{(k)})\}$ generated by underlying function $f: X^n \to Y$, such that the $\hat{f}$ approximates $f$. Any member of the domain $x = x_1, x_2, \ldots, x_l$ is an l-tuple and $x_j$-s corresponds to individual features of the domain. The CDM approaches data analysis and modeling from this perspective of function learning. In the remainder of this section we present the foundation of CDM followed by a discussion of orthonormal representation construction and the relation between such representations and mean square error.

3.1 Foundations

The two primary steps of a typical DDM algorithm are,
1. performing local data analysis for generating partial data models, and
2. combining the local data models from different data sites in order to develop the global model.

As we saw in the previous section, conventional approaches for local analysis can be ambiguous and misleading. We need to make sure that the local analysis produces correct partial models that can be used as building blocks for the global model. Once the partial models are generated from the local data sites, the next step is to combine them for generating the global model. However, we need to keep in mind that nonlinear dependency among the features across the different data sites may exist. This essentially means that the global data model may not be nicely decomposable among the different data sites. Therefore, locally generated partial models alone may not be sufficient to generate the global model. CDM addresses both of these issues as described in the following.

The foundation of CDM is based on the fact that any function can be represented in a distributed fashion using an appropriate set of basis functions. Let $\Xi$ be a set of basis functions. $\Xi$ does not necessarily have to be finite. Let us index the basis functions in $\Xi$ and denote the k-th basis function in $\Xi$ by $\Psi_k$. Let $\Xi_I$ be the set of all such indices of the basis functions. A function $f(x)$ can be represented as, $$f(x) = \sum_{k \in \Xi_I} \omega_k \Psi_k(x) \qquad (1)$$

Where $\Psi_k(x)$ denotes the k-th basis function and $\omega_k$ denotes the corresponding coefficient. The objective of a learning algorithm can be viewed as the task to generate a function, $$\hat{f}(x) = \sum_{k \in \hat{\Xi}_I} \hat{\omega}_k \Psi_k(x),$$

that approximates $f(x)$ from a given data set; $\hat{\Xi}_I$ denotes a subset of $\Xi_I$; $\hat{\omega}_k$ denotes the approximate estimation of the coefficient $\omega_k$. For a given basis representation, the underlying learning task is essentially to compute the non-zero, significant (not negligible) coefficients, $\omega_k$-s.

The CDM makes use of an appropriate set of orthonormal basis functions and computes the basis coefficients to generate the global model of the data. Basis functions are chosen to be orthonormal since the orthonormality property can be exploited for generating correct, unambiguous local basis coefficients (Kargupta, Johnson, Riva Sanseverino, Park, Silvestre, & Hershberger; 1998). Computing the basis coefficients requires computation of the basis functions of the different domain features. The CDM distributes the task of approximate computation of the basis coefficients among different sites using the following decomposition:
1. Generate the coefficients that can be computed using only the locally available feature data.
2. Compute the coefficients, corresponding to the basis functions that requires features from different sites, using the locally generated basis coefficients and a small data set collected from different sites.

Both continuous and discrete functions can be learned in this fashion. However, in the following discussion we shall use only discrete functions for explaining the basic concepts. The following sections explain the basic mechanism of CDM using a simple example.

3.1.1 Generating Correct Partial Models Using Only Local Feartures

Consider a quadratic data modeling problem in which the data set is generated by the function $f(x_1, x_2)=a_1x_1+a_2x_2+a_3x_1x_2$, where $x_1$ and $x_2$ are boolean variables. The data set is $D=\{(x_1, x_2, f(x_1, x_2))\}=\{(0, 0, 0), (1, 0, a_1), (0, 1, a_2), (1, 1, a_1+a_2+a_3)\}$. As before sites A and B observe $x_1$ and $x_2$ respectively. Although the naive approach faces an ambiguous situation, no such problem exists if we use orthonormal basis functions for modeling the data. For example let us consider discrete Fourier basis representation. In this case, $\Xi_k=\{00, 10, 01, 11\}$, i.e., the set of all 2-bit strings. Any function $f(x)$ of boolean variables can be written as $f(x)=\Sigma_{j \in \Xi_k} \omega_j \Psi_j(x)$. Where $\Psi_j(x)$ denotes the j-th Fourier basis function and $\omega_j$ denotes the corresponding Fourier coefficient; for this case $x \in \{00, 10, 01, 11\}$ and $\Psi_j(x)=(-1)^{j \cdot x}$. Fourier coefficients are defined as $\omega_j=1/N \ \Sigma_x f(x)\Psi_j(x)$, where N=4 is the total number of members of the domain. There are four Fourier basis functions in a function of two variables; $\Psi_{00}(x)=1$, $\Psi_{10}(x)=(-1)^{x_1}$, $\Psi_{01}(x)=(-1)^{x_2}$ and $\Psi_{11}=(-1)^{x_1+x_2}$. Clearly computation of $\omega_{00}$ does not require either of $x_1$ and $x_2$; computation of $\omega_{10}$, $\omega_{01}$, $\omega_{11}$ requires only $x_1$, $x_2$, or $x_1$, $x_2$ information respectively. Using the above definitions, we get $\omega_{10}=-(2a_1+a_3)/4$ from site A and $\omega_{01}=-(2a_2+a_3)/4$ from site B; $\omega_{00}=(2a_1+2a_2+a_3)/2$ can be computed at either site A or site B since computation of $\omega_{00}$ does not require the feature values.

We can easily demonstrate that the locally generated Fourier coefficients represent partial models that can be finally put together for generating the correct global data model. In order to show that, let us use the locally generated model at site A, $\hat{f}_a(x_1)=\omega_{00}+\omega_{10}(-1)^{x_1}$, to generate a data set $D_a=\{x_1, \hat{f}_a(x_1)\}=\{(0, \omega_{00}+\omega_{10}), (1, \omega_{00}-\omega_{10})\}$. Similarly at site B we generate the data set $D_b=\{x_2, \hat{f}_b(x_2)\}=\{(0, \omega_{01}), (1, -\omega_{01})\}$ using the model $\hat{f}_b(x_2)=\omega_{01}(-1)^{x_2}$. Solving a set of linear equations we generate the partial models in the canonical representation, $y=b_0+b_1x_1$ at site A. This results in the local model $y_a$, at site A, and a similarly generated model $y_b$ at Site B, where:

$$y_a = \frac{a_2}{2} + \frac{2a_1 + a_3}{2}x_1 \qquad (2)$$

$$y_b = -\frac{2a_2 + a_3}{4} + \frac{2a_2 + a_3}{2}x_2 \qquad (3)$$

Before combining these partial models we need to generate the non-linear term involving the features from both site A and B. The following section describes that process.

3.1.2 Generating Cross-Terms Involving Features From Different Sites

If the model is not completely decomposable among the data sites, cross-terms involving features from different sites will exist in the model. Determination of these cross-terms is essential for accurate modeling of the data. For the particular example at hand, there exists one coefficient $\omega_{11}$ that corresponds to $\omega_{11}(x)$, a basis function requiring both $x_1$ and $x_2$. The coefficient $\omega_{11}$ can be computed using the feature values of a single row from all the data sets. In general if there are m cross-terms involving features from different sites, for a well-posed problem solving the m terms requires exactly m rows from all the data sites. For large databases m is typically a much smaller number compared to the total number of rows in the databases. For example, let us bring the $x_2=0$ information from the first data row to site A in order to have a complete row of data $\{x_1=0, x_2=0, f(x_1, x_2)=0\}$. After combining the locally generated partial models we get the following expression, $f(x)=0=\omega_{00}+\omega_{10}+\omega_{01}+\omega_{11}$. Since we already know all the coefficients except $\omega_{11}$ it can be easily solved to get $\omega_{11}=a_3/4$. As we see, the Fourier representation of a nonlinear model can be generated by moving only a small fraction of data. If the cost of moving a data row from one site to the common site computing the cross-terms is c, then the cost of the communication is O(cm). Since many of the real-life interesting problems exhibit bounded non-linearity, i.e., at most some κ variables non-linearly interact with each other, nm is expected to be a small number compared to the typical number of rows in a large database.

Now the partial model involving the cross-term $\omega_{11}$ can be used to generate the remaining part of the global model in the canonical representation. Since this term involves both $x_1$ and $x_2$, the general model for this part takes the form $y=b_0+b_1x_1+b_2x_2+b_3x_1x_2$. We can generate the data set $D_c=\{x_1, x_2, f_c(x_1, x_2)\}=\{(0, 0, a_3/4), (1, 0, -a_3/4), (0, 1, -a_3/4), (1, 1, a_3/4)\}$ using the function $y_c=\omega_{11}(-1)^{x_1x_2}$. The resulting model in the canonical representation turns out to be $$y_c = \frac{a_3}{4} - \frac{a_3}{2}x_1 - \frac{a_3}{2}x_2 + a_3x_1x_2 \qquad (4)$$

Now we can combine all the locally generated models in the canonical representation, resulting in $$y=y_a+y_b+y_c=a_1x_1+a_2x_2+a_3x_1x_2 \qquad (5)$$

This illustrates that locally generated Fourier coefficients and the cross-terms computed using only O(cm) communication cost can be effectively used for distributed data modeling. However, there is one more thing that we need to address. So far our discussion considered a data set that is exactly the complete domain. Typically, learning and data analysis is performed on a sample of the domain, not the complete domain. The following section addresses the issue of computing orthonormal basis representation from a sample of the domain.

3.2 Orthonormal Representation Construction From Incomplete Domain

Construction of an orthonormal representation requires computation of the basis coefficients. The exact procedure for computing these coefficients depends on the specific set of chosen basis functions. Different "fast", specialized techniques exist for computing different orthonormal representations. However regardless of the specific choice, a function with a large number of significant basis coefficients will require exponential time (in number of features) for computing the orthonormal representation. Polynomial time computation of the coefficients requires two things: (1) a sparse representation, where most of the coefficients are zero or negligible, and (2) approximate evaluation of the significant coefficients.

For many real-life non-linear data mining applications non-linearity typically remains bounded. In other words, not all the features non-linearly interact with every other feature. Typically, it is acceptable if we assume that the number of features that non-linearly interact with a given feature is bounded by some constant, k. Note that if this is not true, we are dealing with a completely non-linear problem which is likely to be difficult for even a centralized data mining algorithm, let alone DDM. In fact this requirement has a deep root in issues of polynomial time, probabilistic and approximate learn-ability (Kushilevitz & Mansour, 1991). If the non-linearity is bounded by k then the orthonormal representation is going to be sparse, satisfying the first condition of polynomial time computation. For example, the Fourier representation of such a function will have a zero value for all coefficients that have more than k number of 1-s in their respective index. In other words, we need to deal with only a polynomial number of coefficients. As we see, the assumption of sparse representation is a quite reasonable one.

The second condition reminds us that only a sample from the domain may be available for computing the basis coefficients. Fortunately, this does not cause a problem as long as our sample size is reasonable. Let us illustrate the rationale behind this observation using our Fourier basis example. Consider what happens when we multiply both sides of Equation 1 by $\Psi_j(x)$; we get $f(x)\Psi_j(x)=\Sigma_{k\in\Xi_l}\omega_k\Psi_k(x)\Psi_j(x)$. If we denote our sample data set by $\Gamma$, then by summing both sides over all members of $\Gamma$ we get, $$\sum_{x\in\Gamma} f(x)\Psi_j(x) = \sum_{x\in\Gamma}\sum_{k\in\Xi_l} \omega_k\Psi_k(x)\Psi_j(x) \qquad (6)$$

Now note that since $\Psi_j(x)\Psi_j(x)=1$, we get $\Sigma_{x\in\Gamma}\Psi_j(x)\Psi_j(x)=|\Gamma|$, where $|\Gamma|$ is the sample size. Now we can write, $$\frac{1}{|\Gamma|}\sum_{x\in\Gamma} f(x)\Psi_j(x) = \omega_j + \sum_{k\in\Xi_l, k\neq j} \omega_k \frac{\sum_{x\in\Gamma}\Psi_k(x)\Psi_j(x)}{|\Gamma|} \qquad (7)$$

Since $\Sigma_{x\in\Gamma}\Psi_k(x)\Psi_j(x)/|\Gamma|$ is the sample mean and the population mean over the complete domain is zero, the sample mean must approach zero as the sample size increases. Therefore, for large sample sizes (which is typically the case for data mining problems) the last term should approach zero. As a result, Fourier coefficients computed over large enough samples should approximate the exact coefficients well.

Figure 3:
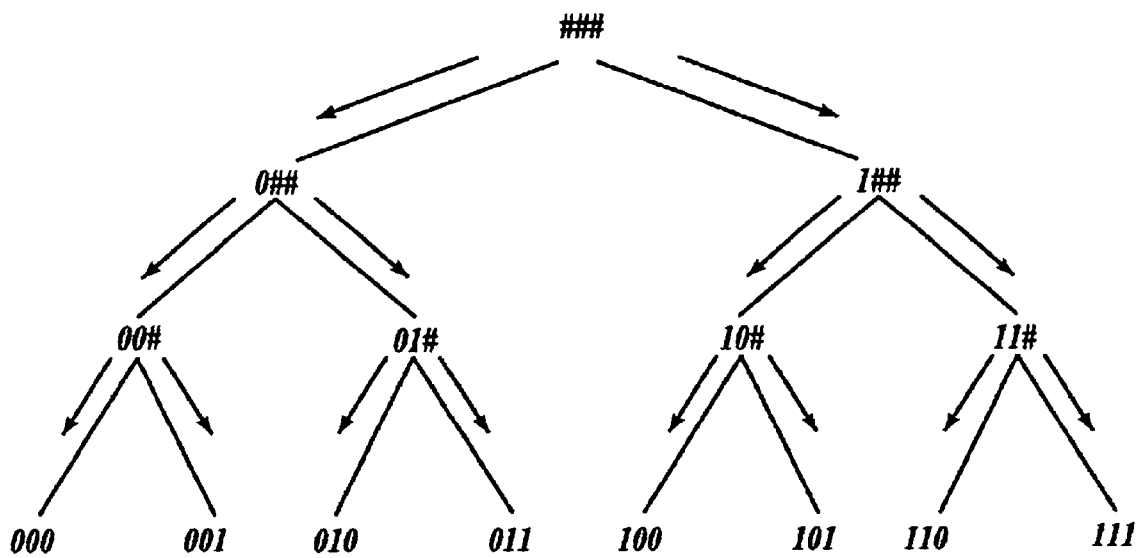
FIG. 3 is a flow diagram of several computation paths performed by one embodiment of the present invention.

Approximate computation of basis coefficients can be made further efficient using different techniques. One possibility is to group the coefficients into different equivalence classes over the space of all indices and then estimating this individual group. Consider the classes, $\omega_{0\#}=\{\omega_{00}, \omega_{01}\}$, $\omega_{1\#}=\{\omega_{10}, \omega_{11}\}$; the # character represents a wild card. Define, $S\alpha=\Sigma_\beta\omega_{\alpha\beta}^2$; where $\alpha$ and $\beta$ denote similarity based equivalence classes defined over the first $|\alpha|$ and the last $|\beta|$ values of the index respectively; 0# and 1# are examples of $\alpha$ and $\beta$ respectively. $\alpha\beta$ denotes the intersection of classes $\alpha$ and $\beta$. For example, $S_{0\#}=\omega_{00}^2+\omega_{01}^2$. Now note that if any of the individual $\omega_{\alpha\beta}$-s has a magnitude greater than some threshold value $\theta$, then $S_\alpha$ must have a value greater than $\theta^2$. Therefore, if $S_\alpha<\theta^2$, then none of the Fourier coefficients with an index string starting with $\alpha$ has a significant magnitude. FIG. 3 schematically illustrates the flow of the algorithm. At every node of the tree we approximately compute $S_\alpha$, and if $S_\alpha$ at the i-th node is less than $\theta^2$ then none of its children can have an $S_\alpha$ value greater then $\theta^2$ and therefore the subtree can be discarded. If the number of non-zero Fourier coefficients is bounded by a polynomial (recall our assumption of bounded non-linearity), we should be able to discard many such sub-trees just by checking the $S_\alpha$ at the root of the sub-tree. Using this idea, a polynomial time algorithm has been developed elsewhere (Kushilevitz & Mansour, 1991) for learning boolean functions with sparse Fourier representation. Also, note that the intersection of all the locally detected significant α-s defines a superset of all the indices corresponding to significant cross-terms. This can be used for efficiently approximating the orthonormal representation.

As described in Section 2, it was shown that minimizing the mean-square error of the local model can lead toward incorrect results. The following section shows that the orthonormal basis function based representation does not suffer from this problem.

3.3 Orthonormal Representation and Mean Square Error

The search for an appropriate data model can be posed as a model-error minimization problem. In this section we show that minimization of the error of a local model leads toward a correct partial model that can be used as a building-block of the correct global data model. Consider, $$f - \hat{f} = \sum_{k} (\omega_k - \hat{\omega}_k) \Psi_k(x) \quad (8)$$

$$(f - \hat{f})^2 = \sum_{j,k} (\omega_j - \hat{\omega}_j)(\omega_k - \hat{\omega}_k) \Psi_j(x) \Psi_k(x) \quad (9)$$

Now summing it over all the data points in the training set Γ, $$\sum_{x \in \Gamma} (f - \hat{f})^2 = \sum_{j,k} (\omega_j - \hat{\omega}_j)(\omega_k - \hat{\omega}_k) \sum_{x \in \Gamma} \Psi_j \Psi_k \quad (10)$$

Where, $\Psi_j$ is the abbreviated representation of $\Psi_j(x_i)$. Note that the basis functions are assumed to be orthonormal. Therefore, $\Sigma_x \Psi_j(x) \Psi_k(x) = 0$, when the sum is over all x-s in the space under consideration and $j \neq k$. On the other hand $\Sigma_x \Psi_j(x) \Psi_j(x) = 1$. Let us define a random variable $Z_i = \Psi_j(x_i) \Psi_k(x_i)$. Now $E[Z_i] = \Sigma_{x_i} \Psi_j(x_i) \Psi_k(x_i) = 0$, when $j \neq k$. By the law of large numbers $$\frac{\sum_{x_i \in s} z_i}{n}$$

approaches $E[Z_i]=0$ as n increases. Therefore for large n, we can write, $$\sum_{x \in \Gamma} (f - \hat{f})^2 = \sum_{j} (\omega_j - \hat{\omega}_j)^2 \quad (11)$$

Clearly, the overall sum of square error is minimized when $\hat{\omega}_j = \omega_j$ for all j. This derivation assumes that all the feature variables are observed and available for model building at the same time. Let us now investigate if the situation changes when feature space is vertically partitioned. Let us assume that the feature space is divided into two sets A and B with feature spaces $S_a$ and $S_b$ respectively. Let $\Xi_a$ and $\Xi_b$ be the set of all basis functions defined by feature variables in $S_a$ and $S_b$ respectively; $\Xi_{ab}$ be the set of those basis functions in $\Xi$ that use feature variables from both $S_a$ and $S_b$. Therefore $\Xi = \Xi_a \cup \Xi_b \cup \Xi_{ab}$. We write $j \in \Xi_a$ to denote a basis function $\Psi_j(x) \in \Xi_a$; we also write $j \notin \Xi_a$ to denote a basis function $\Psi_j(x) \in \Xi_b \cup \Xi_{ab}$. Now let us explore what happens when one of these sites tries to learn $f(x)$ using only its local features. Let us define, $$\hat{f}_a(x) = \sum_{j \in \Xi_a} \hat{\omega}_j \Psi_j(x) \quad (12)$$

From Equations 1 and 4 we can write, $$f(x) - \hat{f}_a(x) = \sum_{j \in \Xi_a} (\omega_j - \hat{\omega}_j) \Psi_j(x) + \sum_{j \notin \Xi_a} \omega_j \Psi_j(x) \quad (13)$$

Using the above equation we can write, $$(f(x) - \hat{f}_a(x))^2 = \sum_{i,j \in \Xi_a} (\omega_i - \hat{\omega}_i)(\omega_j - \hat{\omega}_j) \Psi_i \Psi_j + \quad (14)$$

$$\sum_{i \notin \Xi_a, j \in \Xi_a} \omega_i (\omega_j - \hat{\omega}_j) \Psi_i \Psi_j +$$

$$\sum_{i \in \Xi_a, j \notin \Xi_a} \omega_j (\omega_i - \hat{\omega}_i) \Psi_i \Psi_j +$$

$$\sum_{i \notin \Xi_a, j \notin \Xi_a} \omega_i \omega_j \Psi_i \Psi_j$$

Now again using the law of large numbers we can write, $$\sum_{x \in \Gamma} (f - \hat{f}_a)^2 = \sum_{i \in \Xi_a} (\omega_i - \hat{\omega}_i)^2 + \sum_{j \notin \Xi_a} \omega_j^2 \quad (15)$$

Equation 5 tells us that $\Sigma_{x \in \Gamma}(f - \hat{f}_a)^2$ takes the minimum value of $\Sigma_{j \notin \Xi_a} \omega_j^2$ when $\hat{\omega}_j = \omega_j$. Although the minimum value of the error is non-zero, this optimal solution value of $\omega_i$, $\forall i \in \Xi_a$ remains correct in the global context, even when all the features are considered together. The only difference between the global learning and local learning process is the error term $\Sigma_{j \notin \Xi_a} \omega_j^2$ introduced by the basis functions defined by the feature variables not observed at site A.

Although our discussion so far considered only boolean features, the CDM is certainly not restricted to such cases. The following section briefly discusses this issue.

3.4 Non-Binary Features and CDM

Orthonormal representations for both non-binary discrete and continuous valued features can also be computed for extending CDM to these domains. There exist many choices of orthonormal basis functions that can handle these cases. For example, discrete Fourier functions can be easily extended to λ-ary features (a feature can take λ different values).

$$\varphi_j^{(\lambda)}(x) = \exp^{\frac{2\pi i(x,j)}{\lambda}} \quad (16)$$

Where j and x are λ-ary strings of length l. In other words $j=j_1, j_2, \ldots j_l$ and $x=x_1, x_2, \ldots x_l$. The set of all $\phi_j(x)$ for all possible λ-ary strings j defines a basis.

Wavelet representation (Wickerhauser, 1994) is a possible choice of orthonormal basis functions for dealing with continuous valued features. We shall discuss these possibilities in detail in later sections. The following section identifies the overall CDM algorithm.

3.5 The CDM Algorithm

The main steps of CDM can be summarized as follows:
1. generate approximate orthonormal basis coefficients at each local site;
2. move an appropriately chosen sample of the data sets from each site to a single site and generate the approximate basis coefficients corresponding to non-linear cross terms;

3. combine the local models, transform the model into the user described canonical representation, and output the model.

The following sections present CDM versions of decision tree learning and regression, respectively.

4. DECISION TREE LEARNING IN CDM

Decision trees (Quinlan, 1986) are often used in data mining. In this section we illustrate the construction of an ID3 (Quinlan, 1986) based decision tree from distributed data sites using the CDM approach.

4.1 An Overview of the ID3 Algorithm

Figure 4:
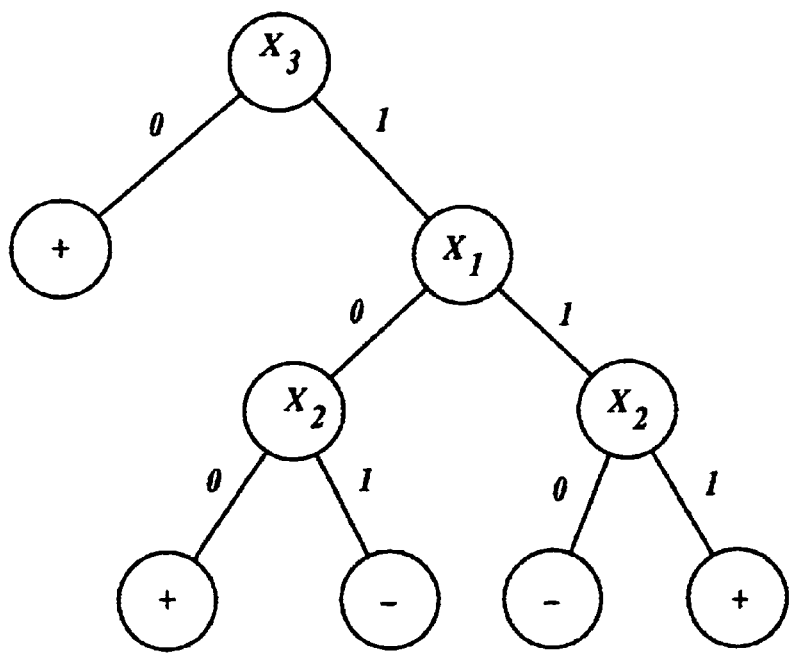
FIG. 4 is a block diagram of a boolean decision tree formed in accordance with the present invention.

The ID3 algorithm builds a decision tree from a given labeled data set. For the sake of simplicity, let us consider a boolean decision tree as depicted in FIG. 4. The boolean class labels correspond to positive and negative instances of the concept class. We can express boolean decision tree as a function $f: X^n \rightarrow \{0, 1\}$. The function $f$ maps positive and negative instances to one and zero respectively. A node in a tree is labeled with a feature $x_i$. A downward link from the node $x_i$ is labeled with an attribute value of i-th feature. A path from the root node to a successor node represents the subset of data that satisfies the different feature values labeled along the path. These data subsets are essentially similarity based equivalence classes and we shall call them schemata (schema in singular form). If h is a schema, then $h \in \{0, 1, *\}^l$, where * denotes a wild-card that matches any value of the corresponding feature. For example, the path $$\left\{\left(x_3 \xrightarrow{1} x_1, x_1 \xrightarrow{0} x_2\right)\right\}$$

in FIG. 4 represents the schema 0 * 1, since all members of the data subset at the final node of this path take feature values 0 and 1 for $x_1$ and $x_3$ respectively.

The ID3 algorithm builds the tree by first constructing the root node using the following scheme. It computes the information-gain for each variable and assigns the variable to the root that maximizes the expected information-gain. Given the schema h for the path to a node from the root, the information gained by replacing the wild card value of some feature $x_i$ in h can be defied as, $$Gain(h, x_i) = Entropy(h) - \sum_{v \in Values(x_i)} \frac{|h_v|}{|h|} Entropy(h_v) \quad (17)$$

where $Values(x_i)$ is the set of all possible values for attribute $x_i$, and $|h_v|$ is the set of those members of h that have a value v for attribute $x_i$; if p and q are the proportions of the positive and negative instances in some h, then $Entropy(h) = -p \log p - q \log q$. Once a variable is assigned to the root, the ID3 algorithm computes information gain for its children and continues to add new nodes if the information gain is significant. As we see, computation of entropy for a given schema is what we need for a decision tree construction. The following section shows that it can be done using the Fourier coefficients.

4.2 From Fourier Coefficients to Entropy

Since the entropy of a schema is computed over a non-uniformly distributed same set, we are going to use an extension of Fourier transformation for non-uniform distributions. Let us define a proportion function P(x), the number of instances of x divided by the size of the data set. Let us also define the proportion-weighted class label, $\phi(x)$ and its Fourier transformation as follows, $$\phi(x) = f(x) P(x) 2^l \quad (18)$$

$$\omega_j = \frac{1}{2^l} \sum_{x=0}^{2^l - 1} \phi(x) \varphi_j(x) \quad (19)$$

where $\phi_j(x)$ is the j-th basis function for Fourier transform.

TABLE 1

Data vectors with their original and complemented function values

| x     | f(x) | $\bar{f}(x)$ |
|-------|------|------|
| 0 0 0 | 1    | 0    |
| 0 0 1 | 1    | 0    |
| 0 1 1 | 0    | 1    |
| 1 0 1 | 0    | 1    |
| 1 1 0 | 1    | 0    |
| 1 1 1 | 1    | 0    |

TABLE 2A

Two sets of Fourier coefficients obtained from normal and complemented function values

| j     | ωj   | ω"j   |
|-------|------|-------|
| 0 0 0 | 0.6̇  | 0.3̇   |
| 0 0 1 | 0.0  | -0.3̇  |
| 0 1 0 | 0.0  | 0.0   |
| 0 1 1 | 0.0  | 0.0   |
| 1 0 0 | 0.0  | 0.0   |
| 1 0 1 | 0.0  | 0.0   |
| 1 1 0 | 0.6̇  | -0.3̇  |
| 1 1 1 | 0.0  | 0.3̇   |

TABLE 2B

Schemata of order one with their proportion-weighted fitness averages computed from normal/complemented function values.

| h     | φ(h) | $\bar{\phi}(h)$ | (+/-) |
|-------|------|-----|-------|
| 0 * * | 0.6̇  | 0.3̇ | 2/1   |
| 1 * * | 0.6̇  | 0.3̇ | 2/1   |
| * 0 * | 0.6̇  | 0.3̇ | 2/1   |
| * 1 * | 0.6̇  | 0.3̇ | 2/1   |
| * * 0 | 0.6̇  | 0.0 | 2/0   |
| * * 1 | 0.6̇  | 0.6̇ | 2/2   |

After finding the Fourier coefficients from the $\phi(x)$ values, we calculate the proportion of positive instances (class label 1) by computing $$\phi(h) = \sum_{j \in J(h)} \omega_j \varphi_j(\beta(h)) \quad (20)$$

where, $$J_i(h) = \begin{cases} 0 & \text{if } h_i = *; \\ & \text{if } h_i = 0, 1; \end{cases} \quad (21)$$

$$\beta_i(h) = \begin{cases} 0 & \text{if } h_i = 0, *; \\ 1 & \text{if } h_i = 1; \end{cases}$$

Further details can be found elsewhere (Bridges & Goldberg, 1991). Given the nonzero Fourier coefficients from all the different sites, we can compute $\phi(h)$. Table 2 (Left) shows the Fourier Coefficients for $\phi(x)$. For example, consider $\phi(1**) = \Sigma_{j \in \{000, 100\}} \omega_j \phi_j(100) = \omega_{000} - \omega_{100} = 0.6$.

Now $\phi(h)$ is nothing but the average of $\phi(x)$ values for all the members of schema h, i.e., $$\phi(h) = \frac{1}{|h|} \sum_{x \in h} \phi(x) \tag{22}$$

where $|h|=2^{l-o(h)}$. Now using Equation 7 we get, $$\sum_{x \in h} f(x) = \frac{|h|\phi(h)}{P(x)2^l} \tag{23}$$

Equation 23 represents the number of members in h with function value one (positive instance). Since we do not know the number of members of h, in order to get the number of negative instances in h, we need another set of Fourier Coefficients that can be obtained from the same data set but with complemented $f(x)$ values. The rightmost column of Table 2 (Right) shows the number of positive and negative instance vectors in each schema of order one. As a check, let us use Equation 11 to calculate the number of positive and negative instances of schemata 1 * * and * * 0. For the schema 1 * *, the number of positive and negative instances are obtained as, $$\sum_{x \in \{1\}} f(x) = \frac{|1|\phi(1**)}{P(x)2^3} = \frac{4 \times 0.6}{\frac{4}{3}} = 2 \tag{24}$$

$$\sum_{x \in \{1\}} \bar{f}(x) = \frac{|1|\bar{\phi}(1**)}{P(x)2^3} = \frac{4 \times 0.3}{\frac{4}{3}} = 1 \tag{25}$$

For the schema 0, $$\sum_{x \in \{0\}} f(x) = \frac{|0|\phi(0)}{P(x)2^3} = \frac{4 \times 0.6}{\frac{4}{3}} = 2 \tag{26}$$

$$\sum_{x \in \{0\}} \bar{f}(x) = \frac{|0|\bar{\phi}(**0)}{P(x)2^3} = \frac{4 \times 0.0}{\frac{4}{3}} = 0 \tag{27}$$

We get the exactly the same numbers as in Table 2 (Right).

Since we can easily calculate the number of positive and negative instances of each schema, measuring information gain achieved by choosing an attribute is straightforward. We only need to give weights by dividing the number of instances in each schema by total number of instances in all schemata under consideration. For example, the weights assigned to * * 0 and * * 1 are $\frac{2}{6}=\frac{1}{3}$ and $\frac{4}{6}=\frac{2}{3}$ respectively. The resulting decision tree from the Fourier coefficients is shown in FIG. 4. The following section considers the general case of building decision trees using CDM for non-binary features.

4.3 Decision Tress With Non-Binary Features

In data mining, we generally deal with data sets of non-binary features. Like Outlook in FIG. 5, a feature may have a cardinality (the number of attribute values) of three or higher. With the same Fourier basis functions, the decision tree building algorithm developed in the previous section fails to work in these non-binary feature sets. In this section, we extend the algorithm by applying a generalized Fourier transform to build a decision tree with non-binary features. Particularly, we choose the further generalized $\bar{\lambda}$-ary discrete Fourier transform which is defined over a non-binary feature set in which all the features may not have the same cardinality.

Recall $\lambda$-ary Fourier basis functions over the set of features of the same cardinality $\lambda$ is defined as $$\varphi_j^{(\lambda)}(x) = \exp^{\frac{2\pi i}{\lambda}(x \cdot j)} \tag{28}$$

The generalized $\bar{\lambda}$-ary Fourier function over data vector of length l is defined as $$\varphi_j^{\bar{\lambda}}(x) = \prod_{m=1}^{l} \exp^{\frac{2\pi i}{\lambda_m} x_m j_m} \tag{29}$$

where $\bar{\lambda}=\lambda_1, \lambda_2, \ldots \lambda_l$ and $\lambda_j$ denotes the cardinality of j-th feature ($x_j$).

Similarly, we redefine proportion-weighted class label $\phi(x)$ and its $\bar{\lambda}$-ary Fourier transform as $$\phi(x) = f(x) P(x) \Pi_{i=1}^{l} \bar{\lambda}_i \tag{30}$$

$$\omega_j = \prod_{i=1}^{l} \frac{1}{\lambda_i} \sum_x \bar{\varphi}_j^{\bar{\lambda}}(x) \phi(x) \tag{31}$$

where $\bar{\phi}_j^{\bar{\lambda}}(x)$ is the complex conjugate of $\phi_j^{\bar{\lambda}}(x)$.

With redefined $\phi(x)$, we can compute the average of proportion-weighted class label ($\phi(h)$) as follows.

$$\phi(h) = \sum_{l_1} \sum_{l_2} \ldots \sum_{l_m} \exp^{2\pi i \left(\frac{l_1 b_1}{\lambda_1} + \frac{l_2 b_2}{\lambda_2} + \ldots + \frac{l_m b_m}{\lambda_{jm}}\right)} \omega_{(0, \ldots, l_1, 0, \ldots, l_2, 0, \ldots, l_m, \ldots 0)} \tag{32}$$

where h has m fixed bits $b_i$ at positions $j_i$ and $l_i$ has the cardinality of $\lambda_i$.

Table 4 (Left) shows the proportion-weighted class label averages of three order one schemata and Table 4 (Right) shows Fourier coefficients which appeared in these average computations.

For example, schema 0* has an average of 0.64286 which is obtained as, $$\phi(0*) = \exp^{2\pi i \times \frac{0-0}{3}} \varpi_{0000} + \exp^{2\pi i \times \frac{0-1}{3}} \varpi_{1000} + \exp^{2\pi i \times \frac{0-2}{3}} \varpi_{2000} \tag{33}$$

$$= \varpi_{0000} + \varpi_{1000} + \varpi_{2000}$$

$$= 0.64286 - 0.12372i + 0.12372i$$

$$= 0.64286$$

TABLE 3

DATA EXAMPLES AND THEIR VECTOR REPRESENTATIONS

| Outlook | Temperature | Humidity | Wind | Play Tennis | X | f(x) | $\bar{f}(x)$ |
|---|---|---|---|---|---|---|---|
| Sunny | Hot | High | Weak | No | 2 2 1 0 | 0 | 1 |
| Sunny | Hot | High | Strong | No | 2 2 1 1 | 0 | 1 |
| Overcast | Hot | High | Weak | Yes | 1 2 1 0 | 1 | 0 |
| Rain | Mild | High | Weak | Yes | 0 1 0 0 | 1 | 0 |
| Rain | Cool | Normal | Weak | Yes | 0 0 0 0 | 1 | 0 |
| Rain | Cool | Normal | Strong | No | 0 0 0 1 | 0 | 1 |
| Overcast | Cool | Normal | Strong | Yes | 1 0 0 1 | 1 | 0 |
| Sunny | Mild | High | Weak | No | 2 1 1 0 | 0 | 1 |
| Sunny | Cool | Normal | Weak | Yes | 2 0 0 0 | 1 | 0 |
| Rain | Mild | Normal | Weak | Yes | 0 1 0 0 | 1 | 0 |
| Sunny | Mild | Normal | Strong | Yes | 2 1 0 1 | 1 | 0 |
| Overcast | Mild | High | Strong | Yes | 1 1 1 1 | 1 | 0 |
| Overcast | Hot | Normal | Weak | Yes | 1 2 0 0 | 1 | 0 |
| Rain | Mild | High | Strong | No | 0 1 1 1 | 0 | 1 |

Figure 5:
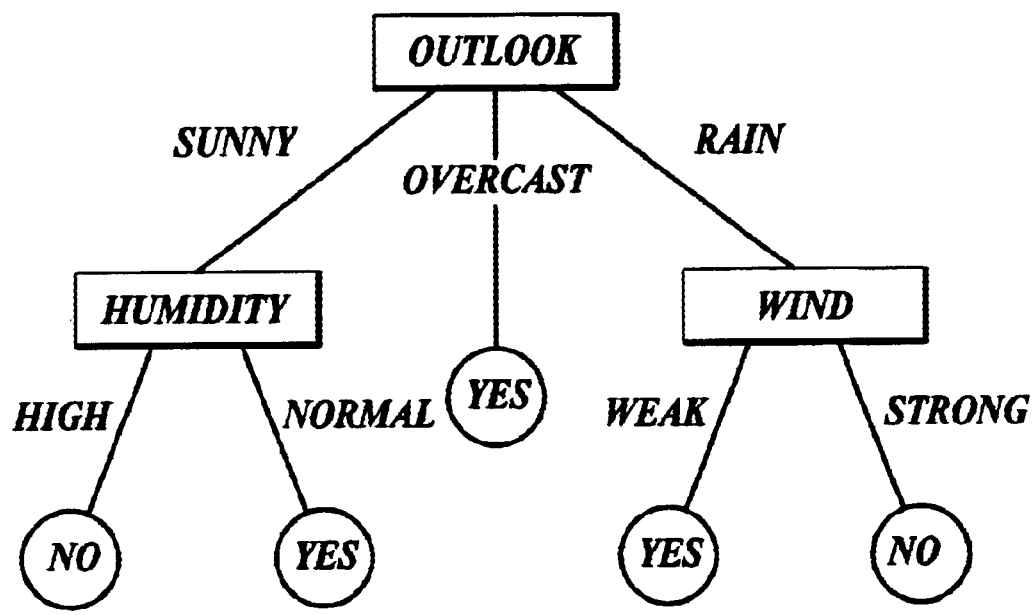
FIG. 5 is a non-binary feature decision tree formed in accordance with the present invention.
Figure 6:
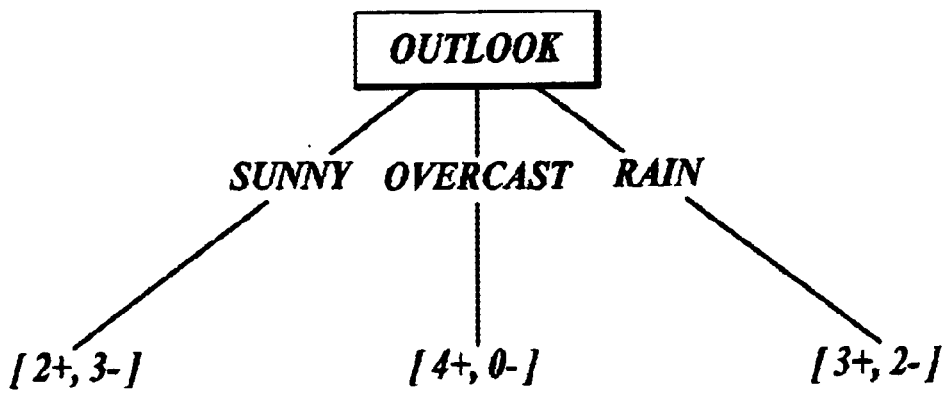
FIG. 6 is a block diagram illustrating positive and negative instances produced by the Outlook embodiment of the present invention.

To illustrate how we calculate the information gain using generalized ($\bar{\lambda}$) discrete Fourier transform, consider the data set in Table 3 (Mitchell, 1997). Notice that both attribute values and class labels are mapped to integers for $\bar{\lambda}$-ary Fourier transform. In FIG. 5, Outlook of cardinality three is chosen as the root. The number of positive and negative instances split by choosing Outlook are shown in FIG. 6. The schema representations of the paths along Sunny, Overcast and Rain links are 2*, 1* and 0* respectively. The proportion-weighted class label averages of these schemata are found in Table 4. As we did in the previous section, we apply equation 11 to check the number of positive and negative instances along each schema. Notice that $P(x)=1/14$ and $\Pi_{l=0}^{L\lambda}\lambda_i = 3\times3\times2\times2 = 36$. For the schema 2*, $$\sum_{X \in \{2*\}} f(x) = \frac{|2*|\phi(2***)}{P(x)\prod_l \lambda_l} = \frac{12*0.42587}{\frac{36}{14}} \doteq 2 \quad (34)$$

$$\sum_{X \in \{2*\}} \bar{f}(x) = \frac{|2*|\bar{\phi}(2***)}{P(x)\prod_l \lambda_l} = \frac{12*0.64286}{\frac{36}{14}} \doteq 3 \quad (35)$$

For the schema 1*, $$\sum_{X \in \{1*\}} f(x) = \frac{|1*|\phi(1*)}{P(x)\prod_l \lambda_l} = \frac{12*0.85714}{\frac{36}{14}} \doteq 4 \quad (36)$$

$$\sum_{X \in \{1*\}} \bar{f}(x) = \frac{|1*|\bar{\phi}(1***)}{P(x)\prod_l \lambda_l} = \frac{12*0.0}{\frac{36}{14}} \doteq 0 \quad (37)$$

And for the schema 0*, $$\sum_{X \in \{0*\}} f(x) = \frac{|0*|\phi(0*)}{P(x)\prod_l \lambda_l} = \frac{12*0.64286}{\frac{36}{14}} \doteq 3 \quad (38)$$

$$\sum_{X \in \{0*\}} \bar{f}(x) = \frac{|0*|\bar{\phi}(0***)}{P(x)\prod_l \lambda_l} = \frac{12*0.42857}{\frac{36}{14}} \doteq 2 \quad (39)$$

Once again, we get the exactly same numbers as in FIG. 6.

5 CDM AND REGRESSION

Regression (Mosteller & Tukey, 1977), like decision tree learning, is a form of supervised learning which fits within the CDM framework. A simple CDM regression example with discrete binary feature variables was presented in Section 3. In this section we present one possible method of extending CDM to regression in the continuous values feature domain.

TABLE 4

Proportion-weighted class label averages of the first bit fixed schemata and some Fourier coefficients generated from data in Table 3.

| h | $\phi(h)$ | $\bar{\phi}(h)$ | j | $\omega j$ | $\omega"j$ |
|---|---|---|---|---|---|
| 0*** | 0.64286 | 0.42857 | 0000 | 0.64286 | 0.35714 |
| 1*** | 0.85714 | 0.0 | 1000 | −0.12372i | 0.03572 + 0.18557i |
| 2*** | 0.42857 | 0.64286 | 2000 | 0.12372i | 0.03572 − 0.18557i |

TABLE 5

Sample data for sparse representation example.

| $f(x_1 \cdot x_2)$ | $x_1$ | $x_2$ |
|---|---|---|
| $b_0 + b_1 + b_2 + b_3$ | 1 | 1 |
| $b_0 + b_1 − b_2 − b_3$ | 1 | −1 |
| $b_0 − b_1 + b_2 − b_3$ | −1 | 1 |
| $b_0 − b_1 − b_2 + b_3$ | −1 | −1 |

Rather than turn to Fourier once again for the orthogonal representation of the underlying function, we choose instead to employ a wavelet transform (Hubbard, 1998; Mulcahy, 1997; Mulcahy, 1996; Stollnitz, DeRose, & Salesin, 1995a; Stollnitz, DeRose, & Salesin, 1995b; Wickerhauser, 1994) to obtain an orthogonal basis. A desirable characteristic of any transform employed for real-valued feature variables is sparse representation of the feature variables in the transform space. This helps produce an orthogonal distributed basis. A method does not currently exist which allows, a priori, the determination of which particular transform produces the most appropriate orthogonal representation for a particular problem. To motivate the choice of wavelet over Fourier consider the function $f(x_1, x_2) = b_0 + b_1 x_1 + b_2 x_2 + b_3 x_1 x_2$, and the associated samples shown in Table 5. If we perform a discrete (trigonomic) Fourier and a wavelet-packet transform on the data, we obtain the results presented in Table 6. The wavelet transform is seen to provide a sparser representation of the feature variables, reflecting the orthogonal basis in the feature space. For this particular example, the wavelet transform products and orthogonal representation which is superior to that of the Fourier transform.

TABLE 6

Discrete Fourier transform vs. wavelet-packet transform for spare representation example.

| 1 | $x_2$ | $x_1$ | $x_1 x_2$ | $f(x_1 \cdot x_2)$ |
|---|---|---|---|---|
| Fourier Transform | | | | |
| 2 | 0 | 0 | 0 | $2b_0$ |
| 0 | 0 | 1 + i | 1 − i | $(b_1 + b_3) + (b_1 - b_3)i$ |
| 0 | 2 | 0 | 0 | $2b_2$ |
| 0 | 0 | 1 − i | 1 + i | $(b_1 + b_3) - (b_1 - b_3)i$ |
| Wavelet-packet Transform | | | | |
| 1 | 0 | 0 | 0 | $b_0$ |
| 0 | 0 | −1 | 0 | $-b_1$ |
| 0 | −1 | 0 | 0 | $-b_2$ |
| 0 | 0 | 0 | 1 | $b_3$ |

5.1 Wavelet Basis and Wavelet-Packet Analysis

A wavelet basis consists of two sets of functions, scaling basis functions, $\phi_i$, and wavelet basis functions, $\phi_i$, where the wavelet functions are dilated and translated versions of the scaling functions (Stollnitz, DeRose, & Salesin, 1995a; Stollnitz, DeRose, & Salesin, 1995b). To understand the relation between the scaling and wavelet functions consider a vector space $S^j$ with $2^j$ dimensions defined on the interval $[0,1)$. $S^j$ contains all functions defined on $[0,1)$ which are piece-wise constant on $2^j$ equal sub-intervals. If $S^{j+1}$ is also defined on $[0,1)$ then every function in $S^j$ is also in $S^{j+1}$ since each interval in $S^j$ may be considered to correspond to two contiguous intervals in $S^{j+1}$. Let $S^j = S^{j-1} + W^{j-1}$, where the subspace $S^{j-1}$ is the orthogonal complement of $W^{j-1}$ in $S^j$. If we assert that the basis functions for $S^{j-1}$ are the scaling functions, $\phi_i^{j-1}$, then the basis functions for $W^{j-1}$ will be the wavelet functions, $\phi_i^{j-1}$. Note that since $S^{j-1}$ and $W^{j-1}$ are complementary orthogonal spaces, the $\phi_i^{j-1}$ and $\phi_i^{j-1}$ will be orthogonal to each other in $S^j$. If, in addition, the $\phi_i^{j-1}$ form an orthogonal basis for $S^{j-1}$ and the $\phi_i^{j-1}$ form an orthogonal basis for $W^{j-1}$, then combined the $\phi_i^{j-1}$ and $\phi_i^{j-1}$ form an orthogonal basis for $S^j$.

A simple set of scaling functions for Si are the scaled and translated "box" functions (Stollnitz, DeRose, & Salesin, 1995a), defined on the interval $[0,1)$ by:

$$\phi_i^j(x) = \phi(2^j x - i), \; i=0, \ldots, 2^j-1, \quad (40)$$

where $$\phi(x) = \begin{cases} 1 & \text{for } 0 \le x < 1 \\ 0 & \text{otherwise} \end{cases} \quad (41)$$

The wavelet functions corresponding to the box basis functions are the Haar wavelets:

$$\phi_i^j(x) = \phi(2^j x - i), \; i=0, \ldots, 2^j-1, \quad (42)$$

where $$\varphi(x) = \begin{cases} 1 & \text{for } 0 \le x < \frac{1}{2} \\ -1 & \text{for } \frac{1}{2} \le x < 1 \\ 0 & \text{otherwise} \end{cases} \quad (43)$$

Any function in $S^j$ may be represented in terms of these basis functions as $$f(x) = s_0^j \phi_0^j + s_1^j \phi_1^j + \ldots + s_{2^j-1}^j \phi_{2^j-1}^j = S^j \quad (44)$$

or also as $$f(x) = s_0^{j-1} \phi_0^{j-1} + \ldots + s_{2^{j-1}-1}^{j-1} \phi_{2^{j-1}-1}^{j-1} + d_0^{j-1} \varphi_0^{j-1} \ldots + d_{2^{j-1}-1}^{j-1} \phi_{2^{j-1}-1}^{j-1} \quad (45)$$

The coefficients, $s_i^{j-1}$ and $d_i^{j-1}$ are generated by convolution of the $s_i^j$ with a set of orthogonal quadrature filters, H and G. For the Haar wavelets, $$H = \left\{ \frac{1}{\sqrt{2}}, \frac{1}{\sqrt{2}} \right\}$$

and $$G = \left\{ \frac{1}{\sqrt{2}}, \frac{-1}{\sqrt{2}} \right\}.$$

Figure 7:
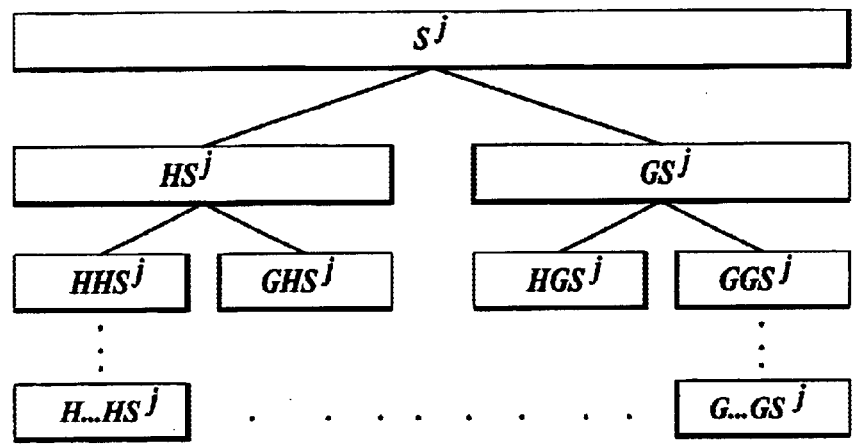
FIG. 7 is a block diagram illustrating the application of quadrature filters in wavelet-packet decomposition.
Figure 8:
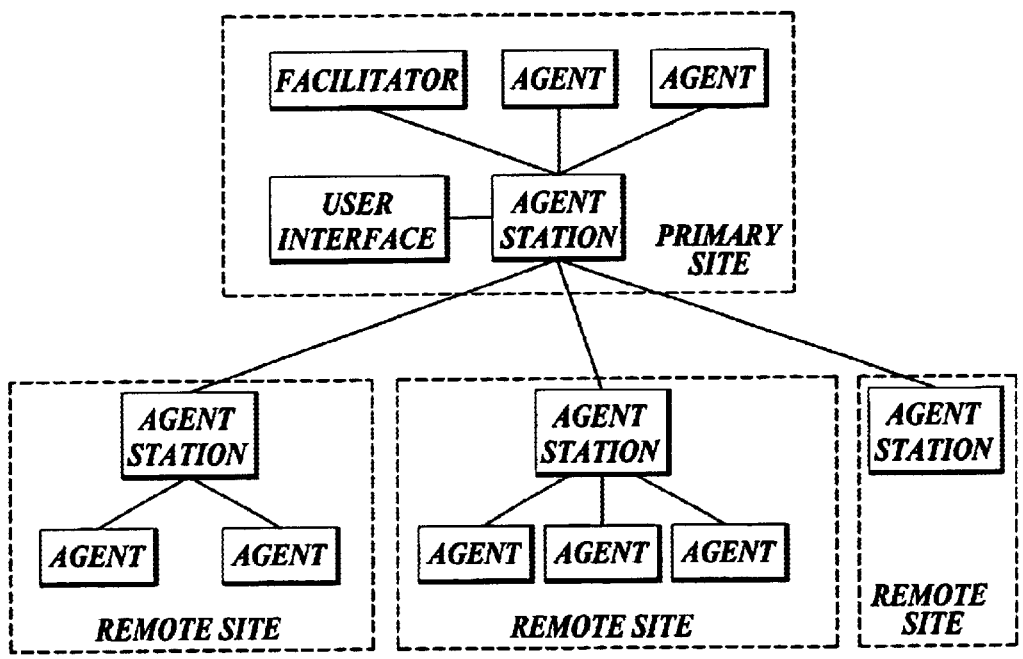
FIG. 8 is a block diagram of a BODHI system formed in accordance with the present invention.
Figure 9:
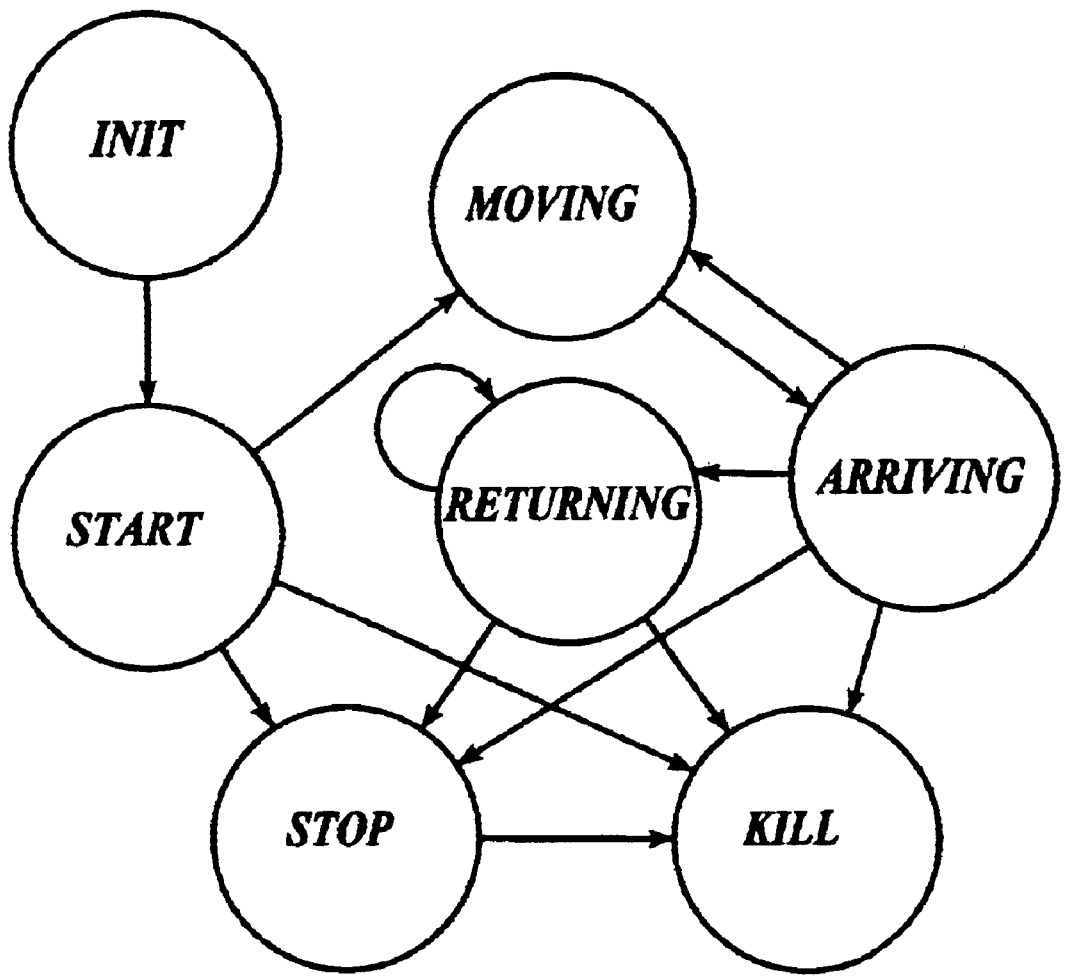
FIG. 9 illustrates a state diagram of an agent within the BODHI system.
Figure 10:
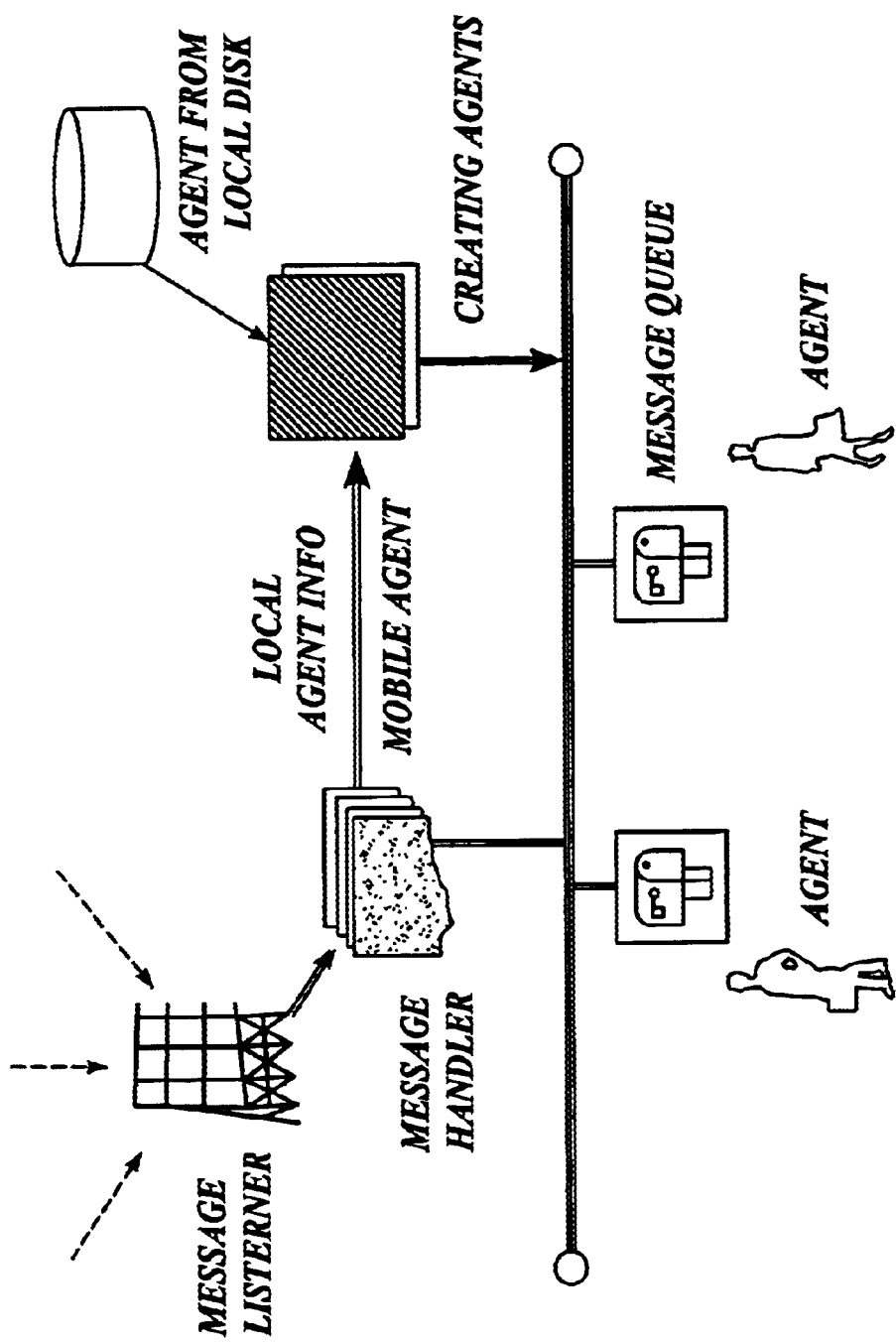
FIG. 10 illustrates the communication flow path of a BODHI system.

The wavelet-packet transform of a function in $S^j$ is calculated by recursively applying the quadrature filters to the s and d coefficients of the next lower dimension scale space and wavelet space as if each represented a separate scale space. In this way, subspace coefficients are calculated for both the scale space and wavelet space representing the next higher dimension scale and wavelet spaces. FIG. 7 shows how the quadrature filters are recursively applied to the scale and wavelet subspaces in generating the wavelet-packet transform. If the original function is in $S^j$ then j recursive applications of H and G will result in $2^j$ orthogonal subspaces of dimension 1, $S_i^0$, i=0, . . . , $2^j-1$. At the top level, only a scale space exists and the $2^j$ function values are the coefficients for the "box" function basis for that space. Selecting the Haar wavelets as the basis functions results in the coefficients of the $2^j$ orthogonal subspaces, $S_i^0$, representing a Walsh transform of the original function.

5.2 Polynominal Regression

Given a partitioned set of real-valued features, x, and a k-term polynomial function of those features, let $\Xi_A$ be the set of indices of terms which are functions only of features found in partition A. In partition A we can form the terms $T_k(x)$, $k \in \Xi_A$ of the polynomial for each sample and apply the wavelet-packet transform to the samples representing each term and to the samples of $f(x)$. Estimates of the local model coefficients, $a_k$, $k \in \Xi_A$, may be generated using standard regression techniques (Mosteller & Tukey, 1977) directly on the wavelet-packet transforms since $S_{f(x)}^0 \approx \Sigma_{k \in \Xi_A} a_k S_{T_k}$, and the $S_{T_k}$, are sparse, making them a nearly orthogonal basis for $S_{f(x)}$. Once the coefficients of the local terms have been estimated, the coefficients of the terms containing cross-partition feature variables may be determined by communicating O(m) samples, as described previously.

To demonstrate the CDM regression algorithm we consider the estimation of local model coefficients for a quadratic polynomial in 15 real-variables with six non-linear terms:

$$f(x)=20x_0+5x_{02}+18x_1-8x_1^2+16x^2+13x_2^2+14x_3+11x_3^2+12x_4-14x_4^2+$$
$$10x_5-8x_5^2+8x_6+11x_6^2+6x_7+13x_7^2-7x_8+12x_8^2-9x_9+15x_9^2-11x_{10}+$$
$$9x_{10}^2-13x_{11}-10x_{11}^2-15x_{12}-16x_{12}^2-17x_{13}-10x_{13}^2-19x_{14}+7x_{14}^2+$$
$$5x_0x_1-3x_6x_{10}+12x_4x_{11}-8x_{12}x_{14}-2x_{13}x_2^2+4x_4^2x_8^2 \quad (46)$$

To observe the effect of sample set size, the CDM regression algorithm is applied to a series of data sample sets of increasing size. Each data sample set in the series contains $2^j$ data samples to allow for a simplified implementation of the wavelet-packet transform algorithm. The data sample set series contains a set for j=6, . . . , 15 Wickerhauser (Wickerhauser, 1994) provides guidance on implementing the wavelet-packet transform algorithm to handle the general case of sample size $\neq 2^j$. A single data sample consisted of 15 randomly generated values of $x_i$, i=0, . . . , 14, and the associated value of $f(x)$ determined by applying those $x_i$s to the polynomial. The random $x_i$ values were generated using the subtractive method given in (Knuth, 1968). The results of evaluation are summarized in FIG. 8 through FIG. 12. Each plot shows the Ratio of estimated to actual local term coefficient on the vertical axis and $\log_2$ of the sample set size on the horizontal axis. The plots show that for each local term, as the sample set size increases from $2^6$ to $2^{15}$ the ratio of estimated to actual coefficient value converges toward 1.0. The results demonstrate that the wavelet-packet transform based CDM regression algorithm produces accurate estimates of the model coefficients.

The following section presents the basic design philosophy for a communications and control system for use within the CDM framework, and, furthermore, presents a working system, BODHI, which is currently under development.

6 BODHI: A COLLECTIVE MINING BASED DDM SYSTEM

As the methods and algorithms for the collective data mining technology were being developed, it quickly became apparent that a framework within which this technology could be utilized would be needed. The number of possible domains of application for such a system is limited only by the number of domains in which there exists distributed data of which analysis of the sort provided by the collective data mining techniques exists. The number of such domains is growing with great speed as the ability to store large amounts of data becomes more feasible due to rapid increases in available hardware and the decreases in cost for such hardware, and as the ability to connect distributed sites through networks, either local or via the Internet, increases. The domains in which the CDM technology could be effectively utilized include scientific research, business, government and military applications. A number of examples of scenarios where the CDM techniques would be of great use are listed in the introduction of this paper. As can be seen from examination of these examples, a system for utilization of the CDM technology must posses certain characteristics in order to maximize its usefulness. These characteristics must include the following:

Communication Facilities: Such a system must be able to communicate effectively between the various sites within the context of the system. Furthermore, the system should be built using existing protocols, and not concern itself with the underlying transport protocol (e.g., TCP/IP). The communication facilities of such a system must be able to handle the transfer of raw data, extracted knowledge, commands and command parameters to the learning algorithms, and even the learning algorithms themselves. In many ways, this is the most significant characteristic of any framework for distributed learning of any sort.

Expandability: There are far too many different approaches and algorithms for machine learning to incorporate them all into a single system. Furthermore, new methods and algorithms for machine learning are constantly being developed. For a CDM system to be effective, it must be able to incorporate new algorithms and methods as needed.

Flexibility: It is well within reason to assume that the user of a CDM system will want to be able to apply the same system to different problems, or different subsets of the same problem. Therefore, the system must be adaptable and flexible enough to allow this process without significant changes to the core of the system.

Mobility: It is important that when portions of the mining process must be performed in a sequential manner, as opposed to parallel manner, that the CDM system be capable of allowing an algorithm to start at one location and then continue at another location.

Adaptable Knowledge Representation: An effective CDM framework must be able to convey knowledge effectively between the various sites within the system. This knowledge representation should not be limited by the system; rather, the system should be adaptable to be usable for whatever knowledge representation was needed.

Cohesiveness: There must be a certain amount of cohesion between the modules within a system. Regardless of the learning algorithm or learning algorithms being applied to the problem at the different sites, the various sites must be able to communicate their knowledge in an agreed upon format. Furthermore, the modules must be able to be synchronized in terms of control flow.

Platform Independence: For such a system to function well within the context of a heterogeneous mixture of platforms and operating systems; the system should be made as platform independent as possible. While portions of the system could be tailored to function on a specific platform and data set (or type of data set), the communication portion of the system should be capable of connecting a variety of different platforms.

Security: In order for such a system to be usable in many of the possible domains for which the CDM technology is suited, it is necessary that the issue of security be addressed. There are three primary areas that need to be addressed: authentication, encryption, and access permissions for the system.

Centralized Control: To make such a system usable with a certain amount of ease, and to reduce the amount of remote configuration, the system should have the functionality built in to control the remote sites and learning algorithms from a centralized site.

To use Example IV from the introduction, concerning the use of CDM techniques for risk factors for breast cancer patients, it can be seen that all of the above listed characteristics are necessary for a feasible, "real world" system. Obviously, it is necessary for the remote sites to be able to communicate the locally learned patterns and the appropriate samples. As the data in this example is a heterogeneous nature (i.e., the data set includes demographic, personal, medical and image data), may be necessary to develop or utilize different learning algorithms for the local analysis of the data. Furthermore, the need for expandability and flexibility may be further seen when it is considered there may be existing algorithms developed for the analysis of the local data that were not previously utilized by the system. If one of the vertical partitions were also horizontally partitioned (e.g., three hospitals involved in the same study, with the same sort of medical data on different patients spread across three different machines), it may well be necessary for a single agent to migrate from one site to another to perform its task. Obviously, the knowledge representation must be understandable by all of the agents within such a system, and as the factors being sought may change, it would be necessary to be able to alter this representation if necessary. There would be no guarantee that the platforms upon which the different agents were operating would be of the same type. Given the nature of confidentiality within the medical domain, it would be critical that the secure data remain so. Finally, the researcher conducting the experiments would have to be able to easily control and configure his experiments.

The BODHI (Besizing knOwledge through Distributed Heterogeneous Induction) System is a system which has been under development that addresses all of the above issues. The BODHI system was first proposed in (Kargupta, Johnson, Riva Sanseverino, Park, Silvestre, & Hershberger, 1998), and since that point in time, has undergone significant design changes. Some of these changes came from practical issues that arose during the implementation process, and others out of further study and reflection upon the problems being addressed.

The BODHI system itself is intended to be not only a framework for the methods and algorithms presented within this study, but also to be usable for future work. Therefore, the BODHI system is an adaptable core for numerous possible applications and directions that the CDM technology may take. In fact, although intended for use with the CDM techniques, the BODHI system can be used for distributed applications outside of the CDM methodology. This flexibility should allow the same system to be used in future research of CDM and other distributed data mining and machine learning methods.

6.1 Design Principles

The BODHI System is an agent based, distributed learning system, providing a transparent running environment and message exchange system, capable of handling mobile agents. The primary design goal of the BODHI system was to create a communication system and run time environment for use in collective data mining which was not bound to any specific platform, learning algorithm, or representation of knowledge. It was considered critical not to put limitations upon the system that would prevent its use in a variety of contexts and with a variety of distributed learning applications. Therefore, the BODHI system was built as an extensible system, providing a framework for communication between, and control of, distributed agents within the system, but without being bound to any specific platform, knowledge representation or machine learning algorithms. To prevent the limitation of the platforms upon which the system could be used, the core of the system was developed using Java. In order to prevent limitations being placed upon the use of the system concerning the learning algorithms utilized or the knowledge and data format, the system provides a generic, extensible framework that is easily adapted to any number of learning algorithms and knowledge and data formats. It should be noted that the BODHI system operates independently of the learning algorithms implemented in the machine learning agents which operate under its control.

The BODHI system is a modularized system, designed using object oriented principles. There is a precise division of responsibility for various tasks between the various components of the system. The primary component of the system is the facilitator module, which is responsible for directing data and control flow between the various distributed sites and the interfaces. Each local site has a communication module, known as the agent station, which is responsible for providing communication between the given local site and other sites, in addition to providing the runtime environment for the agents. Furthermore, the agent stations are responsible for communication security. The agent object within the BODHI framework is an extensible Java object that is used as the interface between the user implemented learning algorithm. This learning algorithm may be implemented either as an extended agent using Java only, or as native code on the local machine. The individual agents and their learning algorithms are intended to be autonomous, and to this end, are not provided as a portion of the BODHI system. In the following discussion, the extensible agent class will be referred to simply as the agent class, or simply as an agent, and an agent class that has been extended to perform a specific learning task will be referred to as a learning agent. Finally, the user interface forms the final component of this system, and allows the user of the system to control the individual agents and schedule the events occurring within the context of the system as necessary.

The BODHI system is designed as an extensible hierarchy. Forming the base of the hierarchy are the individual agents. These agents are the components within the system that, when extended to specific learning algorithms, perform the actual machine learning for the given task. There may be any number of agents operating on a given site within the system, or no agents, on a given site within the system. Agents within the system are autonomous, with minimal restraints placed upon their implementation. These restrictions and criteria are discussed below, but in general, there are two restrictions: (1) that the agents within a given instantiation of the system be able to communicate using a user defined data and knowledge format, and (2) that certain control functions be implemented in each extended leaning agent.

The second layer of the hierarchy is the agent station. Each distributed site within the system is required to have a single agent station. The agent station on a given site is responsible for starting and stopping the agents operating on its site, in addition to keeping track of the capabilities of the agents upon that site. Furthermore, the agent station is responsible for providing the run time environment for all agents operating upon the site for which the agent station is responsible, in addition to routing all incoming and outgoing communication from and to agents operating on that site.

The third layer of the hierarchy consists of the facilitator. The facilitator itself, for purposes of ease of communication, is actually an extended agent; however, it should be noted that from a design perspective, the facilitator is higher in the hierarchy than any agent that has been extended to perform a specific machine learning task. The facilitator is responsible, in conjunction with the agent stations, for coordination of communication security, and, furthermore, is responsible for keeping track of access permissions for the individual agents and agent types.

All communication between the individual agents is accomplished using a message subsystem built into the BODHI system. This generic messaging system allows communication between the individual agents, agent stations, the facilitator, and the user interface. This messaging system is based upon a generic message class, which was loosely based upon the KQML format (Finin, Labrou, & Mayfield, 1997), and is intended to allow new types and formats of messages to be added into the system as necessary for a given specific application of the system. A message may carry either data or a command, or some combination thereof.

The message structure within the BODHI system was designed to be as generic as possible, so as not to constrain future expansions of the system, or limit the capabilities of the system through unnecessary limitations being placed upon the representation of the knowledge or data. To this end, therefore, it is the responsibility of the individual agent to be aware of the message type, and how to parse the content of the message that it is passed. There is, however, a general constraint for a given instantiation of the system, in so far as it is required that when a new agent is added to the system that the system be aware of the knowledge and data format being utilized by that agent.

Two types of security issues arose during the design process for the BODHI system: security of transmissions and access control of the various individual agents. Security of transmissions between two different sites was considered to be a critical point in the design of the system. In particular, two concerns arose: (1) that outsiders might be able to insert commands or data into the flow of messages within the system, and (2) that outsiders might be able to intercept data when it was transmitted from one site to another. These issues are being addressed through the current ongoing implementation of an RSA (Rivest, Shamir, & Adleman, 1978) based encryption scheme during initiation of the system, and a use of a paired private key system for further transmissions. The issue of access control for the individual agents, is currently being addressed through the development of a system of permissions, based both upon permissions for an individual agent and permissions based upon types of agents and the "domain" within which they are operating.

The BODHI system was designed to perform certain specific tasks, including control related tasks, such as initialization, shutdown, and movement of agents, and data flow related tasks, such as the transfer of raw data and extracted knowledge between the individual agents and the end user. The minimal set of basic functionality provided within the BODHI system is listed below:

Initialization and Shutdown of Sites Within the System: One of the primary tasks of the system is the ability, once the system is started, to initialize and shutdown other sites that are part of the system. This allows the end user, once the system has been started on the site that has the controlling modules (i.e., facilitator and user interface modules) to incorporate other nodes (i.e., sites) into the system. While the ability to perform these actions is limited by obvious security restrictions, it allows the end user to perform all the necessary startup and shutdown from the control site. It is necessary, however, that prior to use of a given site within the system that certain setup procedures be applied.

Control of Individual Agents: The BODHI system provides a run time support system and environment under which the individual agents operates. A basic framework, discussed below, for the passing of control commands is provided. It should be noted, however, that while the functionality and protocols for the passing of commands to the individual agents is provided, and the general result of passing certain command strings to the agents is defined, the specific implementation and results of passing these commands is left to the user of the system.

Movement of Agents Between Various Sites Within the System: In many cases, it is useful to have an agent operate at a certain site within the system, and then move to another site within the system to continue its learning process. This functionality is provided by the BODHI system. As all agents are extensions of a basic agent class, it allows the BODHI system to transfer an agent from one site to another, along with any necessary information associated with the agent (e.g., configuration, current state, learned knowledge).

Transfer of Information Between Agents and Sites Within the System: In order for the agents to communicate information, and to facilitate the movement of data between the various sites within the system, the BODHI system provides the basic functionality for the movement of information between the sites and agents within the system. Once again, as with the control flow capabilities provided by the BODHI system, many of the specifics of the type and format of the information and data is left to the end user. To wit, the framework for passing data is provided by the message subsystem, but the types and content are fields within the messages themselves which may be defined by the end user, which allows the user to define the message type, format, and content. A security scheme, which encompasses authentication, encryption, and access control of the agents, is currently being developed to allow for secure communication and the ability for agents to migrate from one site or domain to another without compromising private, secure data.

User Interface: The BODHI system is designed to allow the distributed mining process to be controlled through a user interface that resides upon the primary, initializing node within the system. Therefore, the BODHI system provides the framework for the user interface to monitor and control the agents within the system. While the specific interfaces for specific agents are not provided, when an agent is extended to perform a specific machine learning task, the ability to also extend the interface so as to allow control of the new agent type is provided.

6.2 System Components

The BODHI system consists of five primary component types: (1) the individual agents, which are autonomous entities which perform specific learning tasks; (2) the agent stations, which are responsible for providing the run time environment and also for communication between the agents and other sites within the system; (3) the facilitator, which is itself a specialized instance of an agent, but is responsible for coordinating communication between the various agent stations; (4) the user interface, by which the user of the system is able to configure and control the system, and (5) the individual messages which are passed through the system. Each of these is described below.

6.2.1 Agents

Agent is the extensible base class for any autonomous entity, including the facilitator and any specific learning algorithm, to be used within the BODHI system. An agent is designed to be a mobile entity, and, using the functionality of the rest of the system, be capable of movement from one site to another site. It should be noted, however, that the extended agent that forms the facilitator is not permitted to move; rather, this module is required to run on the same site that the user interface and the first instantiation of an agent station operate.

The BODHI system does not provide any specific learning algorithms bound to the agent class. Rather, the basis for using the agent class as the interface between the actual learning agent and the rest of the BODHI system is provided. It should be noted that the actual machine leaning algorithm my be implemented as a Java extension to the agent class, or by extending the agent class in such a manner as to cause it to call native code on the host machine for the agent.

Agents are intended to be capable of being mobile within the context of the BODHI system. That is, an individual agent is not bound to a particular site within the BODHI system. When an agent moves from one site to another, all necessary information for the agent, including its current state, store of acquired knowledge in whatever format the representation of the knowledge is being stored, and configuration, can be moved from one site to another along with the particular, extended instance of the agent class.

There are seven methods which reflect the various states of the life cycle of an agent. These methods must be extended for each particular type of agent to be used within the system. While this is not intended to be a manual on the use of the BODHI system, it is informative to examine the basis for these seven methods that reflect the life cycle of the agents:

- init: The init method initializes the agent. All necessary initializations for the configuration of the agent are performed using this method.
- start: The start method initiates the actual main learning algorithm that the agent is to perform.
- moving: The moving method is used to prepare the agent to be moved from one site to another. All necessary configuration information, in addition to whatever acquired knowledge the agent has found, is packaged using this method in preparation for the agent to migrate from one site to another. It is necessary once the agent has moved to another site to call the arriving method. It should be noted that the messaging subsystem is used when the agent transfer functionality is utilized. Regardless of how many times an agent is moved from one site to another, it will retain knowledge of the site from whence it originated, in order to allow the agent to return to that site at some future point if necessary (see the returning method below).
- arriving: The arriving method is the method used to restore an agent after it has been moved from one site to another. This method will restore the state of the agent at the new site, and will then cause the agent to continue in its learning process from where it left off at the point that the moving call was made.
- returning: The returning method is similar to the moving method; however, in this case, the agent is prepared to return to the site from whence it originally came.
- stop: The stop method stops the execution of the learning algorithm, and finalizes the results of the learning process. Once the any necessary cleanup has been performed, the kill method is called.
- kill: The kill method halts the execution of the agent, and removes the agent from the system without any finalization processes being called.

Each agent is also associated with its own message queue. It is the responsibility of the individual agent to check the status of the queue periodically, and to respond to the messages within the queue as is appropriate. Certain control messages arriving at an agent's site (via the agent station) concerning that agent may be trapped and acted upon by the agent station (see below). It is the responsibility of the agent station to check if the arriving message is of this type (e.g., a kill message). If the arriving message does not fall into this category, it is simply placed in the agent's message queue, and becomes the agents responsibility to act on as needed.

Each individual agent and agent type is associated with certain permissions which control upon which sites and in which domains an agent may be instantiated, and what sort of movement is allowed. Furthermore, agents and agent types are associated with certain file system privileges. For more information, see the following section concerning security.

6.2.2 Agent Stations

Each node within the system, that is, each individual machine that is running a portion of the: distributed learning being performed, will contain a single instance of an agent station. The agent station is a daemon process responsible for providing the runtime environment for the agents, and passing messages between the individual agents, other agent stations, and facilitator. In addition, all encryption of outgoing messages is to be performed by the agent station, as is all decryption of all incoming messages. The individual agents are never permitted direct access to any of the encryption and decryption routines.

The agent station at a given node is responsible for a number of specific tasks. It is the responsibility of the agent station to receive messages passed from other nodes within the system, and either take action upon them immediately or to pass them to the appropriate agent under the control of the agent station via that agent's message queue. It is also the responsibility of the agent station to initialize the individual agents when they are called into existence, and to clean up after the agents.

When a message is received at a given agent station, through a special message listener, that message is passed to the message handler. If the received message is an instruction to create a new instance of an agent, the message handler passes the message to an agent loader, which is then responsible for creating the new instance of the agent from either the network or from the local file system. Otherwise, the message is passed to the message queue of the individual agent, and it becomes the responsibility of the agent to act upon and, if necessary, respond to the message as necessary.

Prior to loading a new agent, the agent loader will verify that the request for the generation of the new instance of an agent is permissible and possible. A special configuration class associated with the agent is used for this verification that lists all of the necessary components of the agent to be generated, such as necessary classes and other external files. Furthermore, the representation and knowledge type is verified to be the same as the other agents operating under the system to ensure compatibility between the instantiated agents.

Each agent station will have half of a private key pair for encryption, the other half being possessed by the facilitator's agent station. This is to be used for all transmissions between the agent station and the facilitator's agent station. It should be noted that in no case will the agents operating under the agent station be allowed access to this key.

6.2.3 The Facilitator

The facilitator for the system is itself a special purpose agent. However, it is not intended to perform a machine learning task; rather, the job of the facilitator is to coordinate the communication and control flow between the individual agents. The facilitator is also responsible for routing messages between the agents, and tracking the location of the individual agents.

The facilitator, like any other derived agent, operates under an agent station. Therefore, as with any other agent type, the facilitator never is to be allowed direct access to the encryption and decryption routines. However, unlike any other agent type, the facilitator is not permitted to move from one site to another; it must remain upon at the site where it originated. It should be noted that this is the same site from whence the user interface is operated. While it is possible to operate the system from another site (e.g., through the setting of display variables), the actual facilitator, user interface, and associated agent station processes will always run on this initial site.

The primary task of the facilitator is to coordinate communication between the agents. To this end, the facilitator is able to respond appropriately to several calls similar to the KQML scheme: ask one, ask all, tell one, and tell all. These functions allow a message routed through the facilitator to be sent to the appropriate destination or destinations.

The facilitator is responsible for resolution of the type and content of the knowledge represented in the messages passed between agents. When such resolution is necessary, the request will be passed up from the agent through the agent station and to the facilitator, which will then pass the response back to the agent.

Finally, the facilitator is responsible for pre-scheduled coordination of tasks within the overall system by the various agents and agent stations. To this end, when such a scheduling is necessary, the facilitator class is extended to include this functionality. As with much of the other adaptive functionality within this system, the framework for the functionality is provided, but it is left to the end user to implement the specific algorithms.

6.2.4 User Interface

The user interface for the BODHI system is designed, as are the other components of the system, to be expandable and adaptable to the types of agents that the user may incorporate into the system. Therefore, the base user interface is not intended to be the final user interface, but rather, a general basis for controlling the system.

The user interface of the BODHI system runs on the same machine as the facilitator, and communicates through the facilitator to the other components within the system. As noted above in the facilitator section, the user interface process cannot move from the machine that it was started upon.

6.2.5 Messages

Messages are the final component of the BODHI system. All communication between the various components, including all agents, the user interface and the facilitator, of the BODHI system is accomplished using messages. Once the security subsystem is implemented, all messages are to be encrypted by the agent station at the sending machine, and are to be decrypted by the receiving machine. Furthermore, there, every message will be signed so as to allow verification of the origin of the message.

In order to preserve the ability for the system to handle any data, knowledge or control strings needed for a given use of the system, the message format is defined in such a manner as to allow it to carry virtually any kind of content. The message consists of four primary sections: the envelope, the message type, the content description, and the message content.

The envelope portion of the message is the addressing portion of the message. This allows the sender and receiver, in addition to the node (agent station) upon which the sender and receiver are operating, to be identified. The envelope portion of the message contains four primary entries: the sender, the receiver, the sending agent station, and the receiving agent station. It should be noted that it is the responsibility of the facilitator to route the message; when the sender sends the message, it does not need to know the actual, real location (i.e., IP address) of the recipient; it need only know the system-assigned name of the recipient.

The message type determines what the purpose of the message is. The message type can be divided into three types, which are further divided into sub parts. These three primary types are command, ask, and tell. The command type of message passes a command to either an agent station, telling that station to perform some action, such as creating an agent, or to an individual agent. The ask type is a request for information from a specific agent, and may be either a unicast or broadcast request for information. The tell type is an agent's way of sending data, and also can be of a unicast or broadcast type. In the case of a unicast transmission, there is only one recipient; in the case of a broadcast transmission, all agents within the domain(s) or agent station(s) represented in the recipient fields will receive the message.

The content description of a message is an encoding of what the content of the message contains, and allows the recipient to parse the content of the message. It is the responsibility of the facilitator to maintain the table of types of messages, and it is further the responsibility of the specific agent to be able to respond to the message in an appropriate manner.

Finally, the content portion of the message is the main body of the message. Its encoding is determined by the content description field of the message. Once again, it is the responsibility of the individual agent to be able to understand this section based upon what the content description of the message indicates the format of the content section to be.

6.3 Use of the BODHI System

When the system is initialized, three objects are initially created. First, the primary agent station is created, and all of its necessary components, available data and knowledge formats, and other configurations are registered. Second, the facilitator module is initiated on the same site as the primary agent station. Third, the user interface is initiated, once again, on this same site. Neither the facilitator nor the user interface is allowed to be mobile, as the learning agents are.

When a new agent is generated on the initial site, all necessary checking is done by the local agent station, and, if all necessary components exist, and if the new agent conforms to the current state (e.g., available knowledge formats, data representations), then it is instantiated.

Prior to another site being added to the system, it is necessary that it be prepared for use in the system. This preparation includes several steps. First, the initial site must have the public key for RSA public-key encryption transmissions, and the private site must have the key generated at the remote site. Second, the remote site must have the file system prepared, in terms of permissions for the user account for which the system is to operate under, necessary files for the agents to be used on that system, and accessibility of data. Finally, the remote site must be registered with the necessary permissions at the initial site.

Assuming the above preparations have been performed, the remote site can be added to the system. A RSA public key encrypted command is sent to the remote site (e.g., using ssh) to start the agent station for the remote machine. This initialization command includes as an argument the private key that is to be used by the system during its operation.

It should be noted that the above security procedures are currently under development. The system has been tested in a non-secure mode; however, it is considered necessary for general use of the system that these security procedures be incorporated.

Once an agent station is started at a remote site, that site may be used in the normal manner, in so far as agents may be started and stopped and moved to and from that site.

When a remote site is to be removed from the system, it is necessary for all the agents operating at that site to first be moved from that site. Following this, the agent station may be halted at that site. Similarly, when the initial site is to be halted, it is first necessary for all remote sites and any agents operating at the initial site to first be halted. At this point, the user interface, facilitator, and agent station at the initial site may be halted.

6.3.1 Use of BODHI for CDM

The BODHI system was developed as a system for use in conjunction with the techniques of CDM. However, it should be noted that BODHI is capable of handling other distributed learning techniques, and, furthermore, is capable of being easily adapted to new CDM techniques as they are developed.

The CDM algorithm is easily applied using the BODHI system. A learning agent is extended from the base agent class at each of the distributed sites. This learning agent then generates the approximate orthonormal basis coefficients at each of the local sites. This list of the approximate orthonormal basis coefficients must, of course, be defined as a knowledge type within the context of the message subsystem, and the agents being utilized within the system must be aware of the representation being used.

Following the generation of the orthonormal basis functions at each of the distributed sites, the needed samples from the data sets are transferred to a single site in order for the non-linear cross terms to be generated. As with the approximate orthonormal basis coefficients, the message subsystem and the agents must be aware of the user-defined format for the data.

Once the chosen single site has received the data, it can then combine the local models, transform the model into the user described canonical representation, and output the model. The user of the BODHI system need only extend the base agent classes to perform these tasks; the rest of the communication and ability to send the necessary control sequences to coordinate this process are built into the core BODHI system.

6.4 Security Issues

There are two types of security issues relating to the BODHI system. The first is message security, and involves outsiders being able to impersonate or intercept transmissions. The second issue involves user (or agent) privileges in terms of locations upon which an agent may operate, and what data it is able to access as it moves from one site to another.

There are many instances when security issues of both types would be an important consideration in a CDM system. For example, referring to the second example in the introduction of this study, if two banks were to exchange data patterns relevant to fraudulent intrusion, it would be necessary to have an agent with the permissions to mine the local data at one site without the permissions to mine the data at other sites. Furthermore, it might be necessary to have such an agent move between one site and another within a given bank's computer domain, and have certain access privileges within this domain. However, it would be important that such an agent not be able to directly access the data from another bank's domain. The security of communication of the discovered patterns would be quite significant in this scenario also, as it could be almost as damaging for the institutions, if not more so, for the discovered patterns to be intercepted or altered. Finally, in this sort of context, it is critical that a new, added system not introduce any security holes into the existing computer systems.

6.4.1 Message Security

There were two primary concerns relating to message security during the design. The first concern was that outsiders might be able to insert a command or data message into the system. The second concern was that an outsider might be able to intercept data when it was transmitted from one node to another. It should be noted that at a given site, the BODHI portion of the system operates as a single threaded process, and therefore, there is no danger of interception of messages between an agent and its agent station.

The description of the security portion of the BODHI system is based upon the design performed. The actual implementation of the security system is still underway.

The approach to message security to be taken within the BODHI system involves two phases. First, the initial transmission that creates a new agent station on a remote machine is to be encrypted using an RSA public key encryption scheme. This requires that the remote machine have a private key associated with it, and that the initial node have the public key for the remote machine.

Included as an argument to the (encrypted) initialization command to the agent station process at the remote machine will be a private key. The associated public key will be broadcast to the other agent stations within the system. All future transmissions to the new agent station will be signed by the sender, and encrypted using the public key. This will ensure that false messages cannot be inserted into the system, and, furthermore, that the messages cannot be intercepted by an outside party.

6.4.2 Access Control

The second security issue relating to this sort of system involves access control, and control permissions. It is necessary that the data available to a given agent be controlled, especially when an agent may move from site to site. Furthermore, it is necessary that, as agents are allowed to send control commands to one another, that there be a method for controlling permissions for agents issuing commands to one another.

Access control is performed by associating a list of permissions with each individual agent and agent type. The facilitator is responsible for keeping track of these permissions. These permissions include the listing of which site an agent is allowed to operate upon, what sort of agent movement is permissible, and what files are available upon the local file systems to the specific agent and type of agent. There is a global configuration for each type of agent, listing these parameters. When instance of an agent is instantiated, these permissions may be modified. It should be noted that this modification may include a further limitation of the permissions, but never an increase in the available permissions.

7 CONCLUSIONS AND FUTURE WORK

Heterogeneous data sites are common in many business, government, military, and scientific information processing environments. The field of DDM must develop a well-grounded approach to deal with this general situation before DDM can be claimed to offer a viable alternative to current commercially available centralized data mining systems. CDM technology offers a possible solution to this problem. The methods presented here show that CDM can generate global data models in a distributed fashion without sacrificing the solution quality.

The use of orthonormal basis functions to generate partial models from heterogeneous data sites in order to then generate a complete model was presented in this chapter as the basis for the CDM technique. CDM versions of the ID3 decision tree learning algorithm for both binary, and discrete non-binary feature domains were presented. Results were also presented for a wavelet based CDM regression algorithm which operates in features in the continuous domain. The adaptation of these algorithms to the CDM environment has proved to be a viable application of DDM in a heterogeneous, distributed environment, supporting the assertion that the CDM techniques is a feasible methodology.

Furthermore, this chapter presented basic requirements for a useful, robust CDM communication and control system, and presented the BODHI system as an existing, viable method of applying the CDM techniques. The BODHI system incorporates these basic principals and requirements, and has been shown to be a functional system. While the BODHI system is still being developed and refined, it has to date achieved the goals for which it was designed.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of generating a data model from distributed, partitioned, non-homogenous data sets, comprising:
    a) generating a set of orthogonal basis functions that define the data model;
    b) computing an initial set of coefficients for the basis functions based on a set of local data;
    c) refining the initial set of coefficients based on data extracted from the distributed, partitioned, non-homogenous data sets; and
    d) using the refined coefficients and orthogonal basis functions to predict a plurality of relationships between the distributed, partitioned, non-homogenous data sets.

2. The method of claim 1, wherein the set of orthogonal basis functions, are generated by:
    a) evaluating a strength level of a class prediction by a plurality of classifiers defined by the set of coefficients related to the set of orthogonal basis functions;
    b) identifying a plurality of common data subsets that indicate incorrectly predicted data by a plurality of computing agents;
    c) transmitting the plurality of common data subsets to a central computing device from the plurality of computing agents, thereby creating a received data subset; and
    d) generating the set of orthogonal basis functions from the received data subset.

3. A system for generating a data model, comprising:
    a) a first computing device having a facilitator program, wherein the first computing device is communicatively connected to a data network; and
    b) at least one computing agent, wherein the computing agent is communicatively connected to the data network, and wherein the first computing device and at least one computing agent comprise a program code for:
        i) identifying at least one basis function and a corresponding set of coefficients related to the basis function;
        ii) generating a set of indices corresponding to basis function;
        iii) transmitting the set of indices from at least one computing agent to the first computing device; and
        iv) evaluating a strength level of a class prediction;
        v) identifying a common data subset that is predicted by at least one computing agent; and
        vi) generating a set of basis functions from the common data subset.

4. A method of generating a data model from distributed, partitioned, non-homogenous data sets, comprising:
    a) identifying a portion of a plurality of data sets at a plurality of computing devices;
    b) identifying a modeled set of data by considering a plurality of basis functions generated by at least one local feature space of the plurality of computing devices; and
    c) generating at least one local basis function from the modeled set of data, wherein the local basis function is defined by a cross-term from different local feature spaces of the plurality of computing devices.

* * * * *